Sept. 22, 1953 J. R. BOSWELL 2,652,867

PORTABLE LOG DEBARKER FOR SAWMILLS

Filed Oct. 10, 1949 24 Sheets-Sheet 1

*INVENTOR.*

JOHN R. BOSWELL

*BY*

Mawhinney & Mawhinney

ATTORNEYS

Sept. 22, 1953 J. R. BOSWELL 2,652,867
PORTABLE LOG DEBARKER FOR SAWMILLS
Filed Oct. 10, 1949 24 Sheets-Sheet 2

INVENTOR.
JOHN R. BOSWELL
BY
Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 3

INVENTOR.
JOHN R. BOSWELL
BY Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 4

INVENTOR.

JOHN R. BOSWELL

BY Mawhinney & Mawhinney

ATTORNEYS

Sept. 22, 1953 J. R. BOSWELL 2,652,867

PORTABLE LOG DEBARKER FOR SAWMILLS

Filed Oct. 10, 1949 24 Sheets-Sheet 5

INVENTOR.
JOHN R. BOSWELL
BY Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 6

INVENTOR.
JOHN R. BOSWELL
BY
Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 7

*INVENTOR.*
JOHN R. BOSWELL
BY
Marechal & Noe
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 8

*INVENTOR.*
JOHN R. BOSWELL
*BY* [signature]
ATTORNEYS

INVENTOR.
JOHN R. BOSWELL
BY
Mawhinney & Mawhinney
ATTORNEYS

PORTABLE LOG DEBARKER FOR SAWMILLS

Filed Oct. 10, 1949 24 Sheets-Sheet 10

INVENTOR.
JOHN R. BOSWELL
BY Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 11

INVENTOR.
JOHN R. BOSWELL
BY
Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 12

INVENTOR.

JOHN R. BOSWELL

BY Mawhinney & Mawhinney

ATTORNEYS

PORTABLE LOG DEBARKER FOR SAWMILLS

Filed Oct. 10, 1949 24 Sheets-Sheet 13

*INVENTOR.*
JOHN R. BOSWELL
*BY*
[signature]
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 14

*INVENTOR.*
JOHN R. BOSWELL
*BY*
[signature]
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 15

*INVENTOR.*
JOHN R. BOSWELL
*BY* Marechal & Noe
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 16

INVENTOR.

JOHN R. BOSWELL

BY Mawhinney & Mawhinney

ATTORNEYS

Sept. 22, 1953 J. R. BOSWELL 2,652,867

PORTABLE LOG DEBARKER FOR SAWMILLS

Filed Oct. 10, 1949 24 Sheets-Sheet 17

INVENTOR.
JOHN R. BOSWELL
BY
Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 18

IVENTOR.
JOHN R. BOSWELL
BY Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 19

INVENTOR.
JOHN R. BOSWELL
BY
Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 20

INVENTOR.
JOHN R. BOSWELL
BY
Marechal & Noe
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 21

*INVENTOR.*

JOHN R. BOSWELL

*BY* Mawhinney & Mawhinney

ATTORNEYS

*INVENTOR.*
JOHN R. BOSWELL
BY Mawhinney & Mawhinney
ATTORNEYS

Sept. 22, 1953 J. R. BOSWELL 2,652,867

PORTABLE LOG DEBARKER FOR SAWMILLS

Filed Oct. 10, 1949 24 Sheets-Sheet 23

INVENTOR.
JOHN R. BOSWELL
BY
Mawhinney & Mawhinney
ATTORNEYS

PORTABLE LOG DEBARKER FOR SAWMILLS

Filed Oct. 10, 1949 24 Sheets-Sheet 24

INVENTOR.
JOHN R. BOSWELL
BY
Mawhinney & Mawhinney
ATTORNEYS

Patented Sept. 22, 1953 2,652,867

UNITED STATES PATENT OFFICE 2,652,867

PORTABLE LOG DEBARKER FOR SAWMILLS

John R. Boswell, Mobile, Ala., assignor to The Bark-Off Corporation, Mobile, Ala., a corporation of Alabama Application October 10, 1949, Serial No. 120,511

17 Claims. (Cl. 144—208)

The present invention relates to improvements in portable log debarking machines, and has for its main object and purpose to provide a novel and more efficient machine for the removal of bark from logs.

It is a known fact that trees of today are much more crooked and misshapen than those of past years. To debark a log bent even six inches off center is a problem since the log would be displaced radially from its normal position in the machine a distance of approximately twelve inches if the log is held at both ends.

Another problem confronting the operators of sawmills in the process of debarking logs is the matter of knots, hollows, and the butts of sawed off limbs.

It is an object of the invention to meet and overcome these problems in a machine which is as efficient on misshapen, bent or knotty logs as upon straight ones.

A further object of the invention is to provide an improved portable log debarking machine in which the bark is completely removed from the logs even around knots or the like.

A still further object of the invention is to provide an improved machine of the above character in which the logs are so smooth and clean of bark after the debarking operation, that all slabs and edgings are utilizable in the manufacture of paper or for other purposes, whereas heretofore the presence of adhering bark on the logs after debarking has prevented such utilization.

It is a further object of the invention to provide an improved debarking machine in which the sawdust from the debarked logs is entirely free from the bark and may therefore be used for the making of plastics or the like or for other purposes wherein bark-free sawdust is required.

A still further object of the invention is to improve portability in a log debarking machine by providing a number of sections bolted or otherwise secured together in the composite machine, the sections permitting easy separation and dismantling for the purpose of transportation.

Other objects of the invention are to provide an improved flailing device for the debarking of the logs, an adjustable spur wheel couple which act in a preliminary way to bite into the bark and to compress and break the bark so as to prepare it for the subsequent flailing operation, feed means for rotating the log while moving it endwise past the flailing station, an adjustable smooth tired wheel couple to receive the log after the debarking and to assist in its spiral feed movement and to advance the same to its final station where means is provided for ejecting the log from the machine, and in general to provide an organization of these various agencies and mechanisms into a compact construction of a machine operating simply and with a simple drive mechanism for the various parts whereby the debarking of logs may be carried out economically and speedily in that the machine will have a great capacity.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view, on a reduced scale, of a portable log debarking machine constructed in accordance with the present invention.

Figure 1:
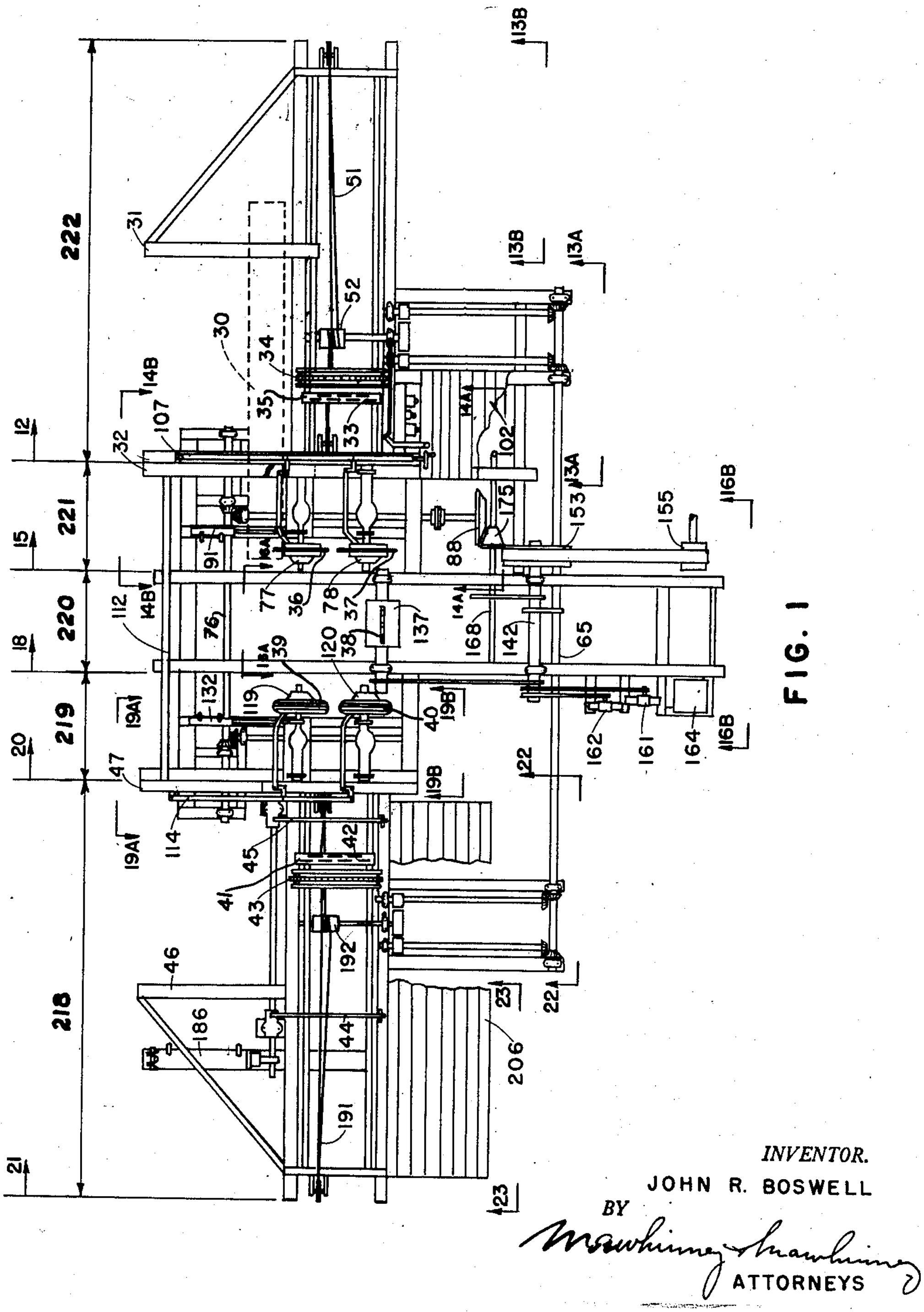
Figure 2:
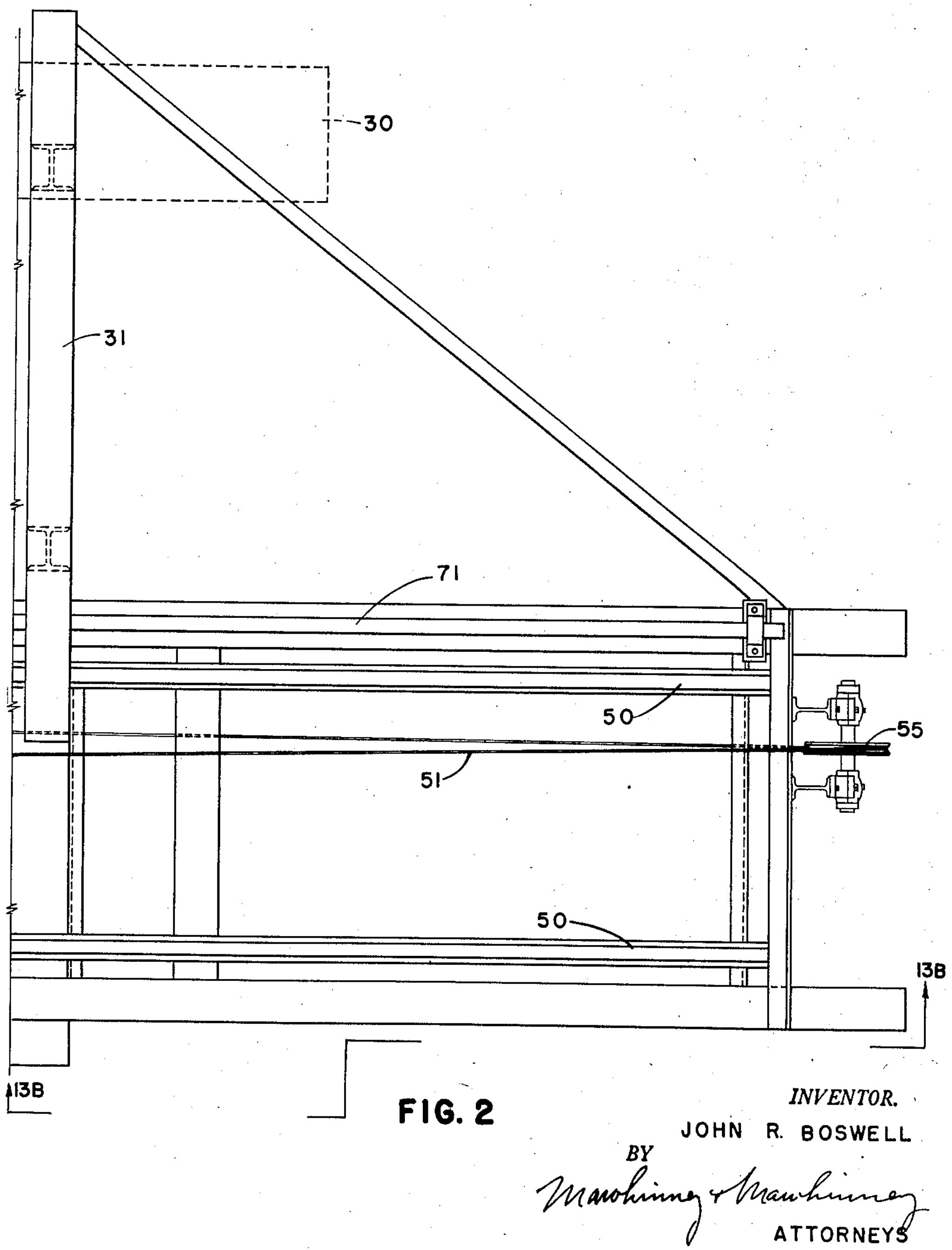
Figure 2 is a fragmentary top plan view of the machine at the log receiving side thereof, as seen from the viewing line 2—2 in Fig. 13B.
Figure 3:
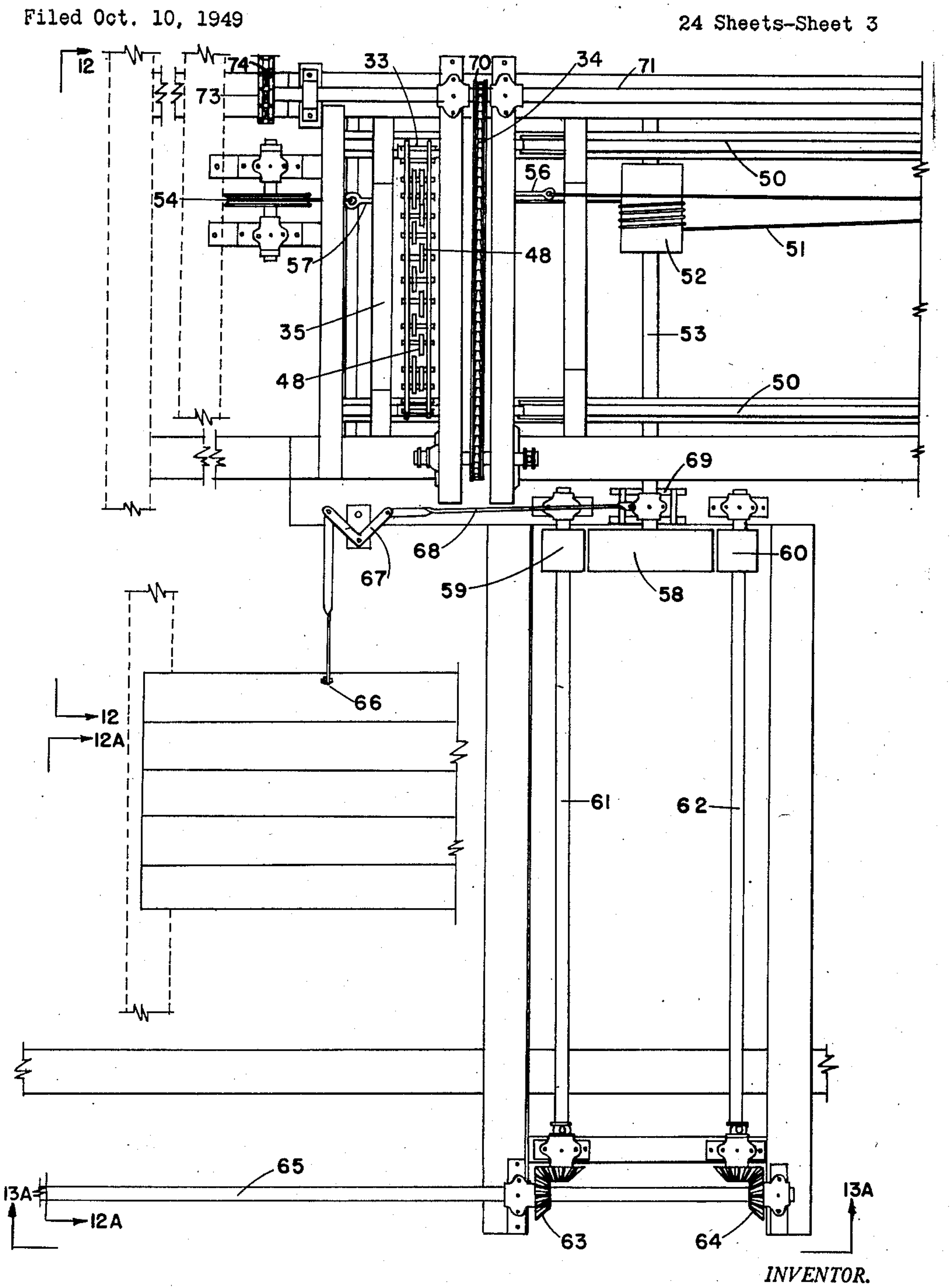
Figure 3 is a fragmentary top plan view, with parts broken away, and shows the log receiving carriage and the means for driving the same, as seen from the viewing line 3—3 in Fig. 13A.
Figure 7:
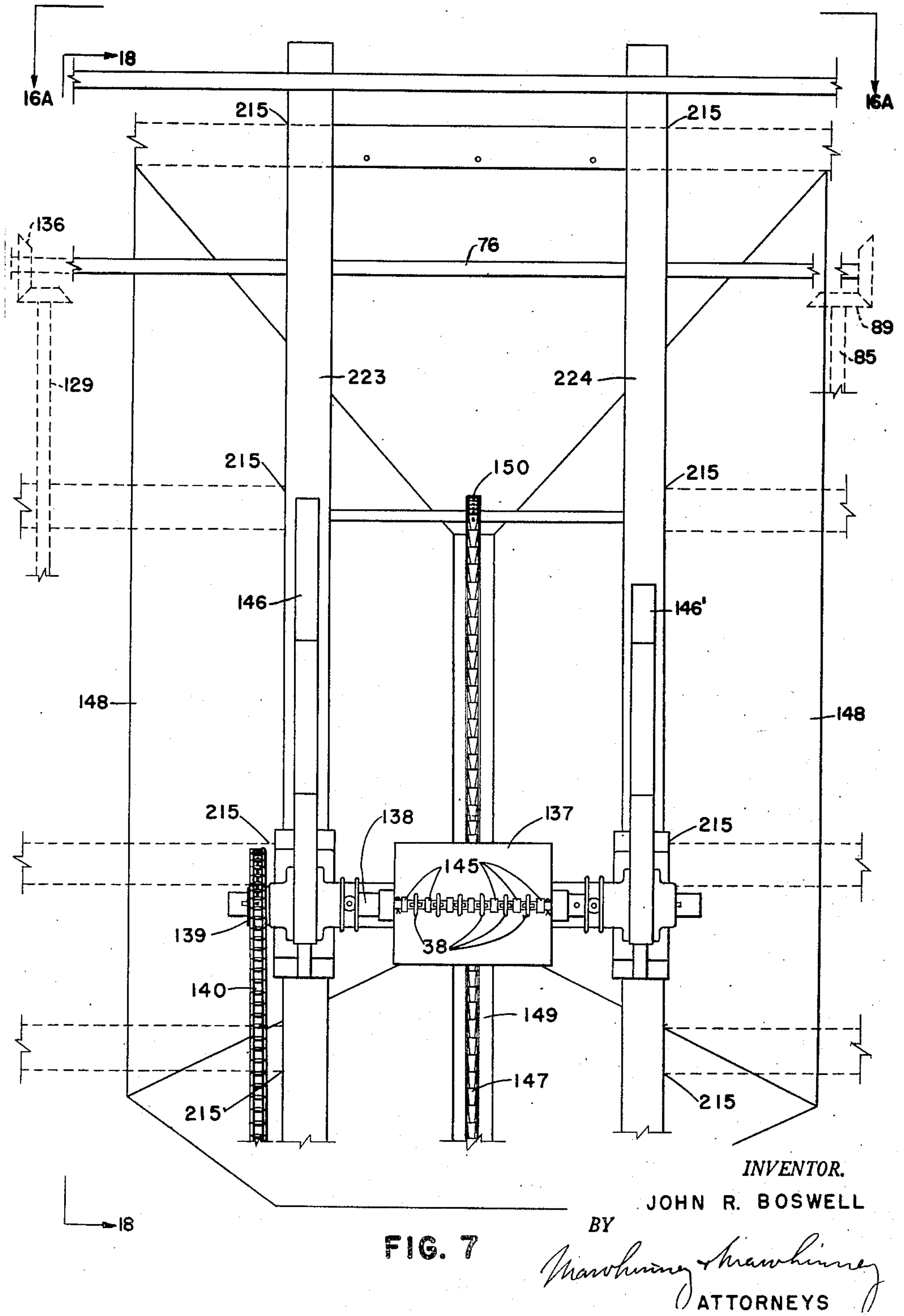
Figure 7 is a plan view of the central portion of the machine with the flailing device and its drive and with the bark removal conveyor.
Figure 16A:
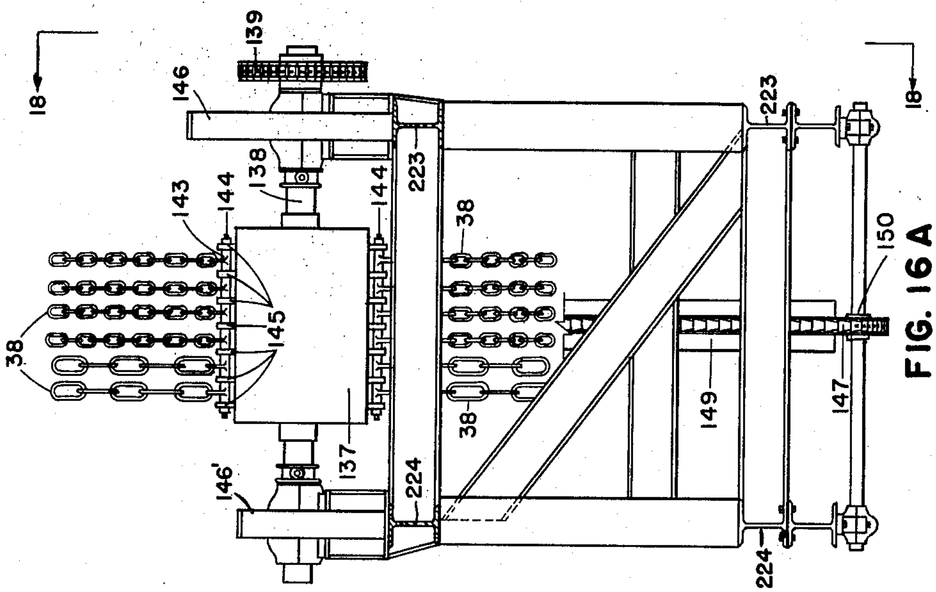
Figure 16A is a rear elevational view of the flailing mechanism, parts being broken away and parts being shown in section, the viewing plane being indicated by the section lines 16A—16A in Figs. 1, 7 and 18.
Figure 16B:
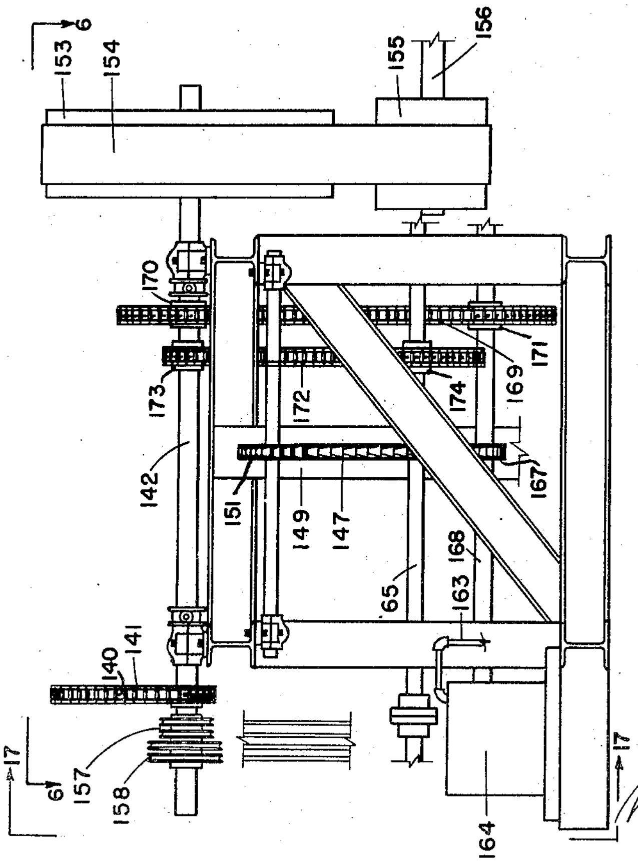
Figure 16B is a front elevational view of the bark disposal conveyor and its drive, as seen from the viewing lines 16B—16B in Figs. 1, 6 and 17.
Figure 17:
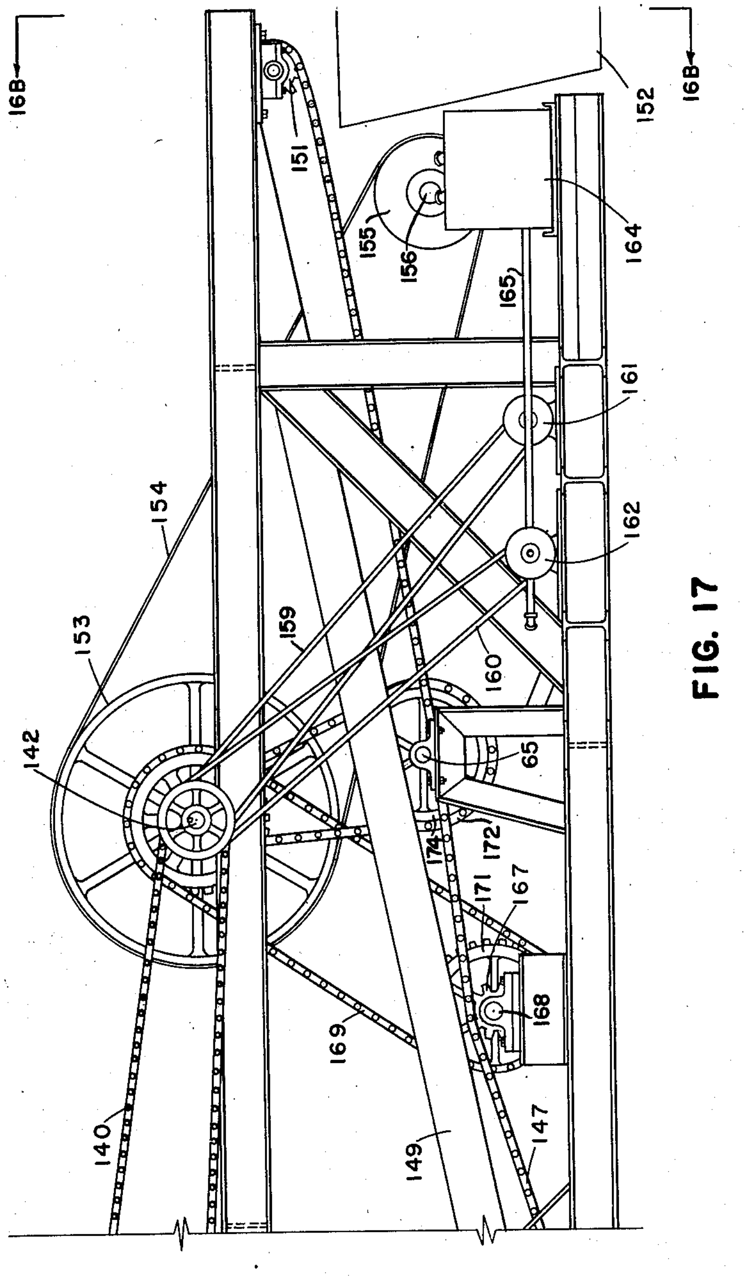
Figure 17 is a transverse sectional elevation, as seen from the lines 17—17 in Figs. 6 and 16B, and shows the hydraulic pumps and the mechanism for driving them, and also shows the bark disposal conveyor.
Figure 18:
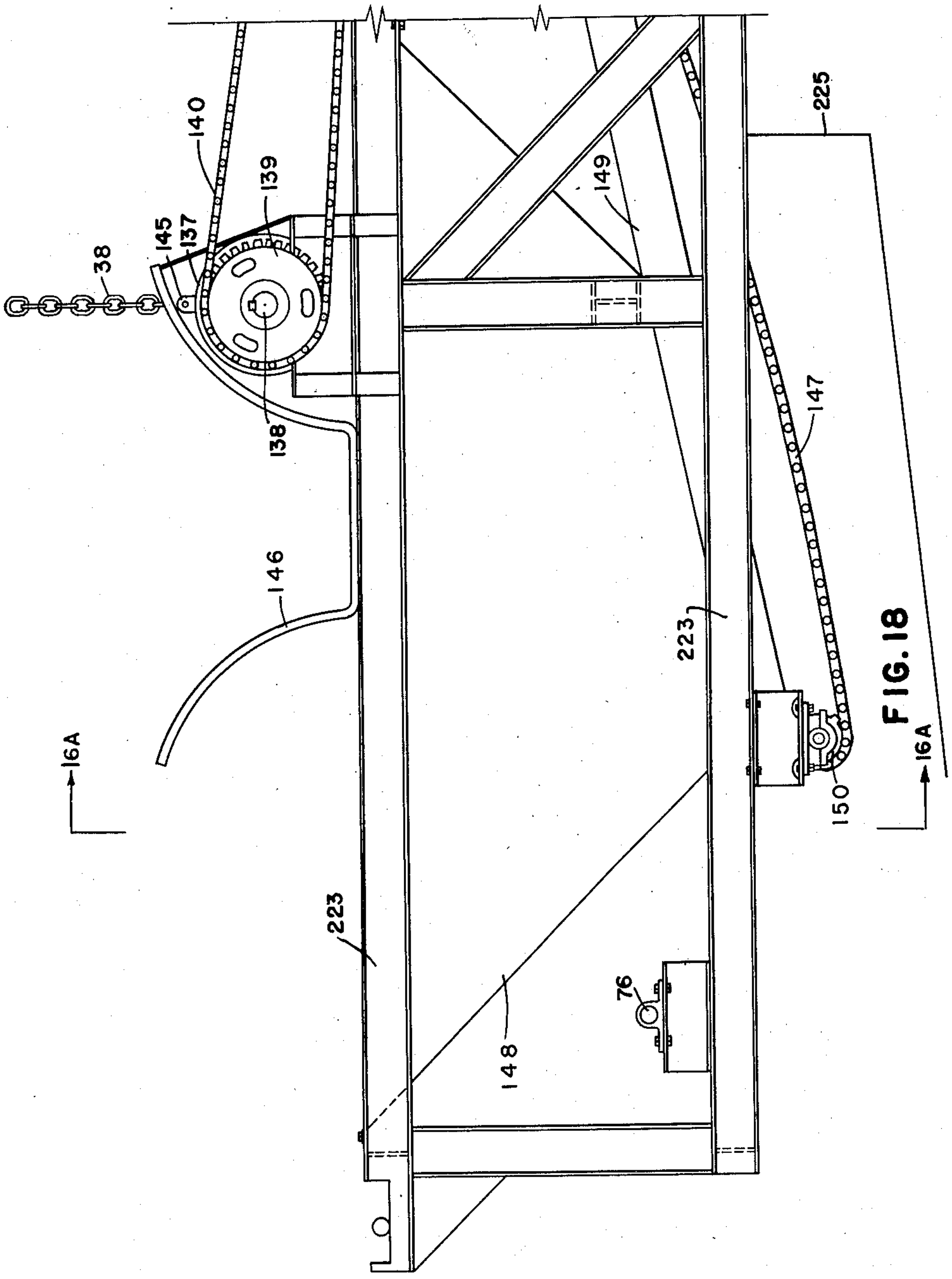

Figure 18 is a continuation of the left hand end of Figure 17, and is taken on the section line 18 in Fig. 1 and the section line 18—18 in Fig. 7, and may also be seen from the viewing line 18—18 in Fig. 16A.

Figure 9:
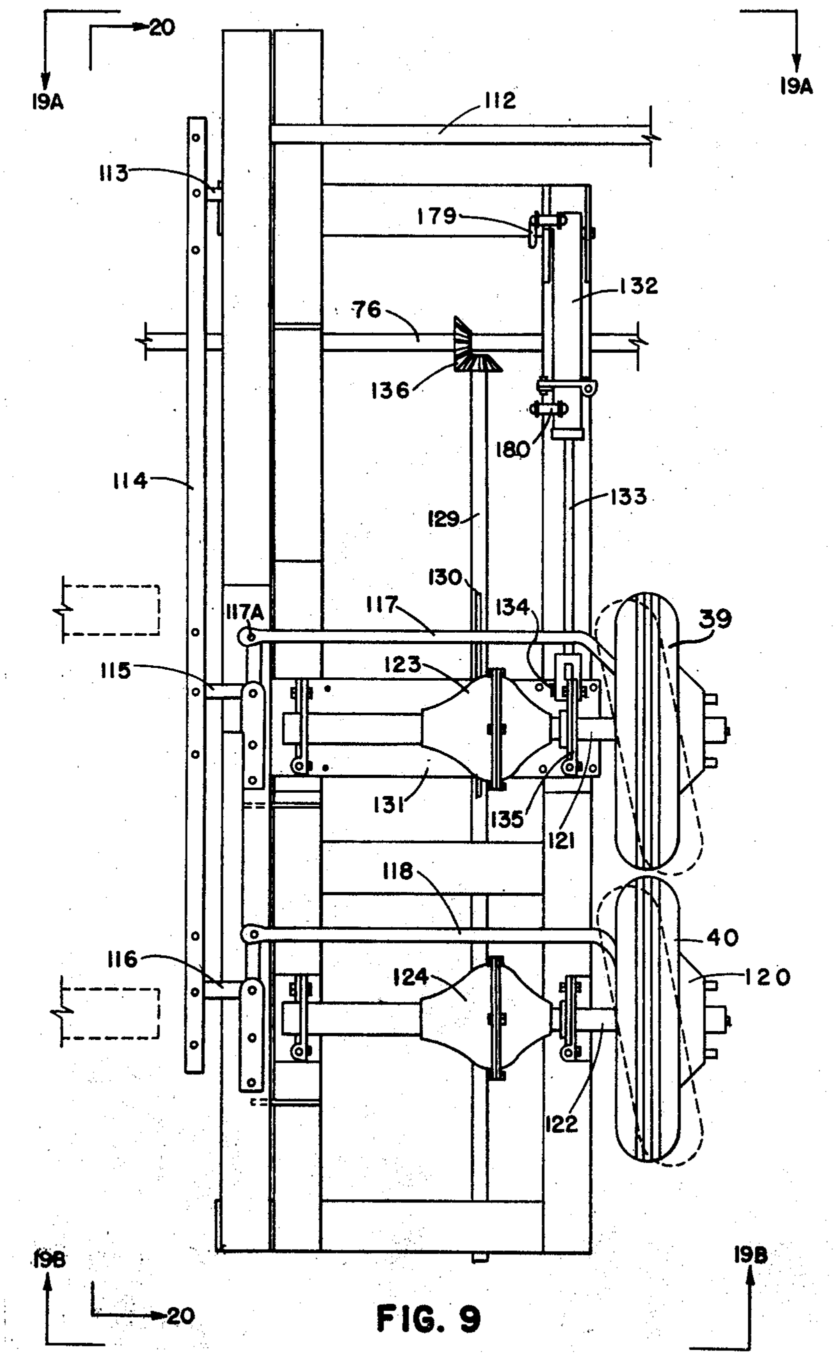
Figure 9 is a top plan view, as indicated by the viewing line 9—9 in Fig. 19B, and adds the superstructure omitted in Figure 8, such as the smooth-tired wheels and their mountings.
Figure 19A:
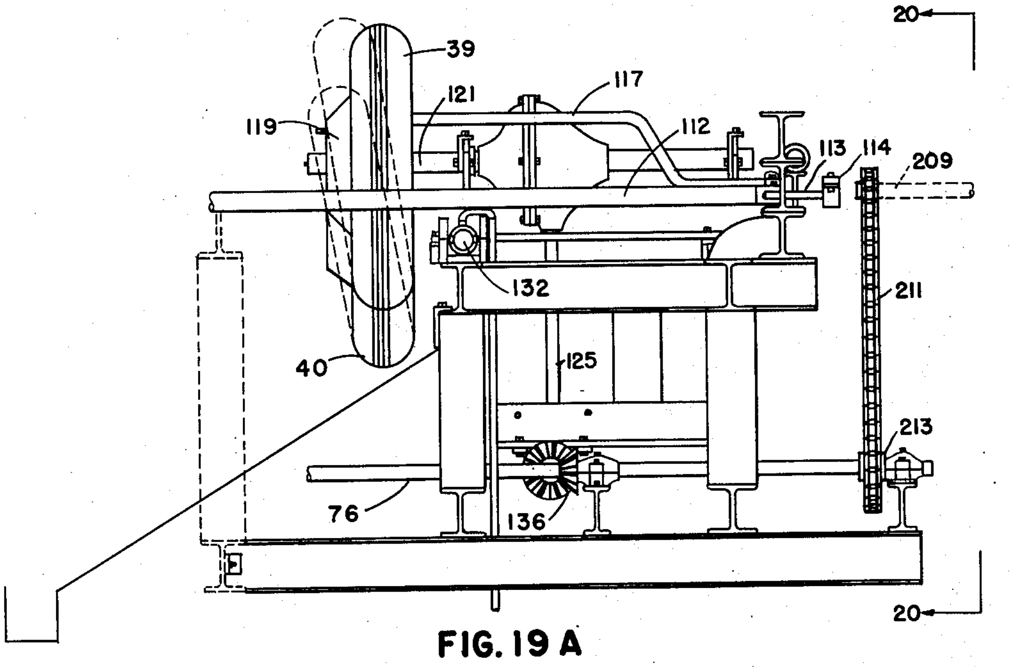
Figure 20:
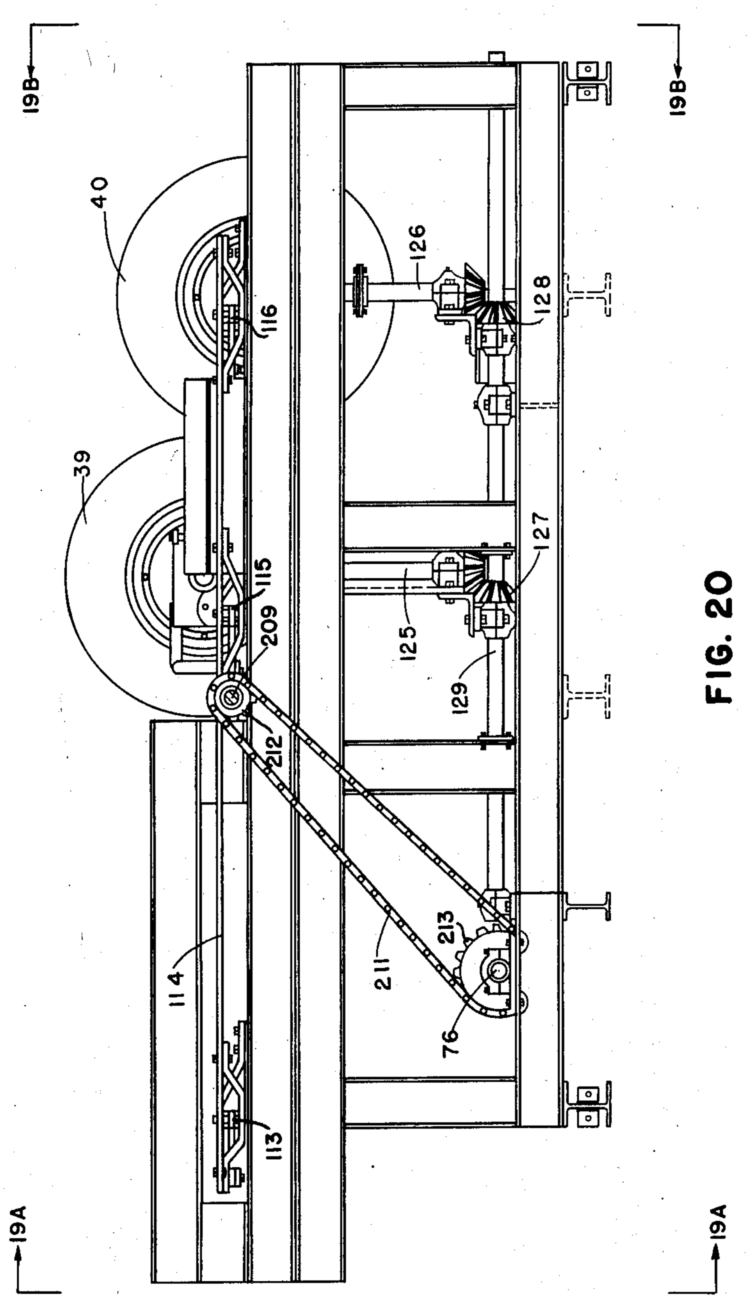

Figure 19A is a fragmentary rear elevational view of the smooth-tired wheels, as seen from the viewing lines 19A—19A in Figs. 9 and 20, broken lines showing each wheel in an adjusted position.

Figure 19B:
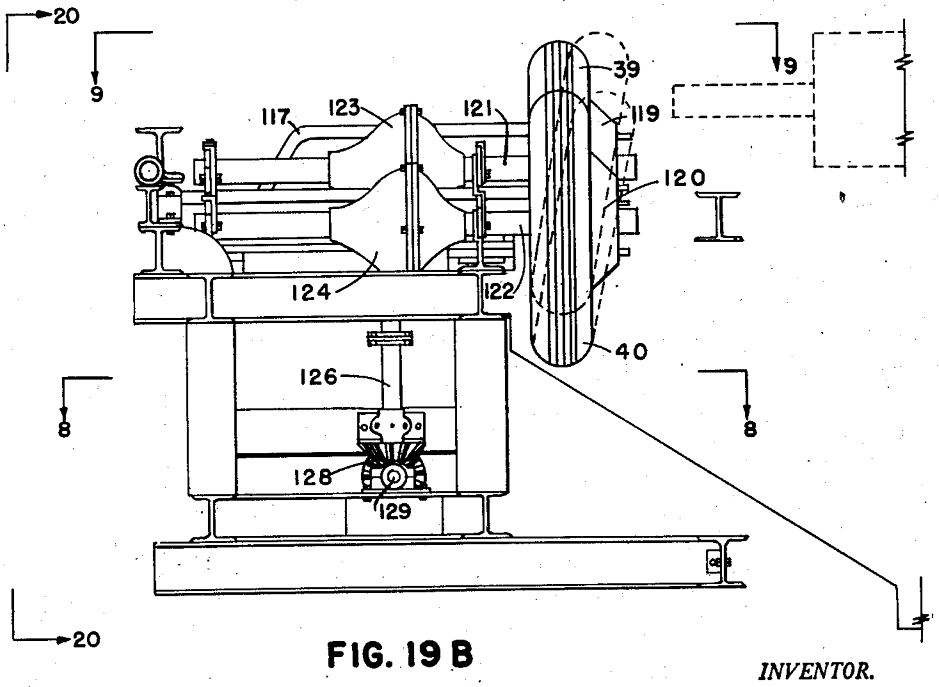

Figure 19B is a fragmentary front elevation, and shows the opposite side of the structure of Fig. 19A, as seen from the viewing lines 19B—19B in Figs. 1, 9 and 20.

Figure 20 is a transverse section on the section line 20 in Fig. 1, and as may also be seen from the lines 20—20 in Figs. 8, 9, 19A and 19B, and shows the smooth-tired wheels and their adjusting and driving mechanisms.

Figure 11:
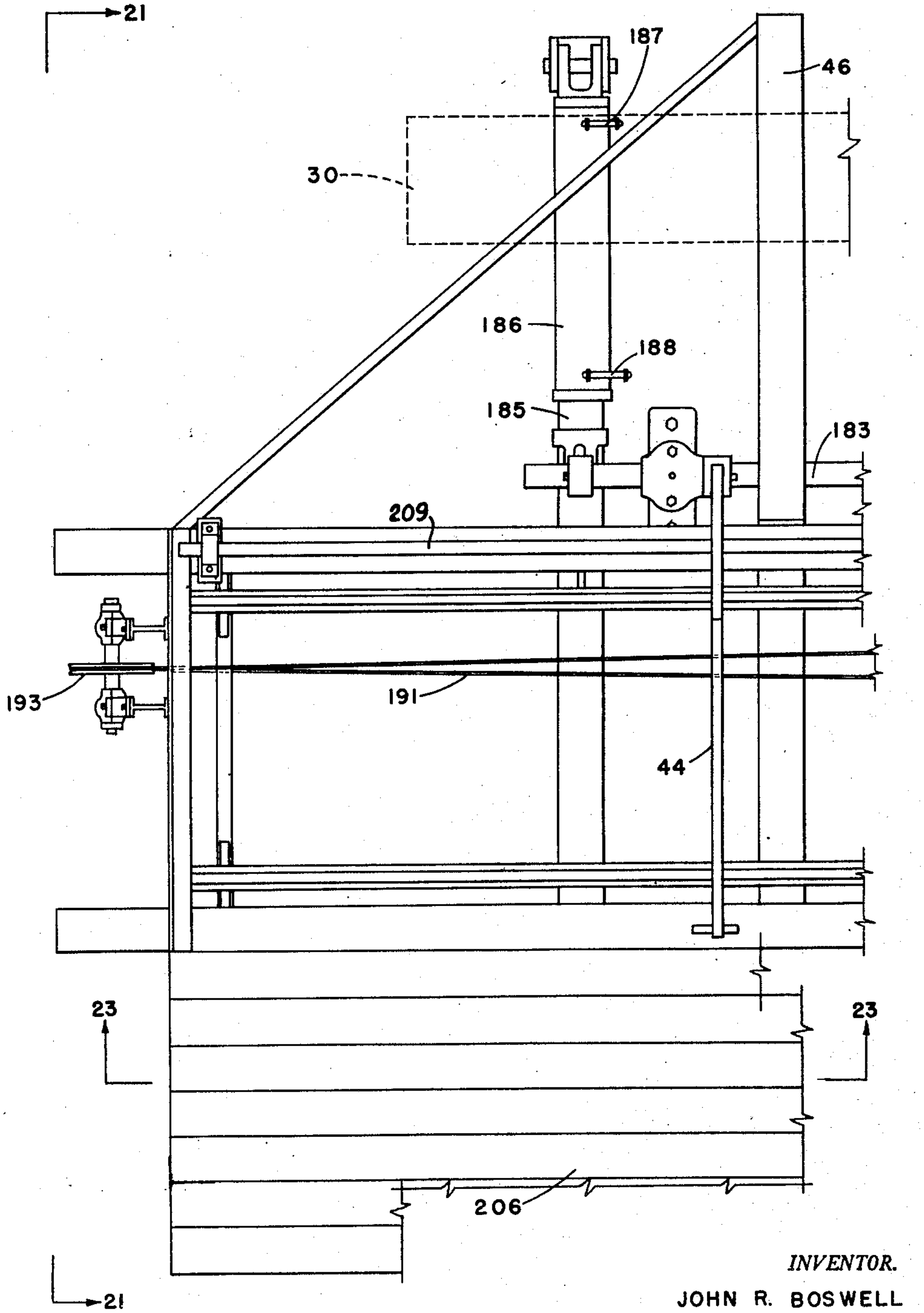
Figure 11 is a top plan view of the ejecting end of the machine, as it would appear from the viewing line 11—11 in Fig. 23, and shows the hydraulic ejector device.
Figure 21:
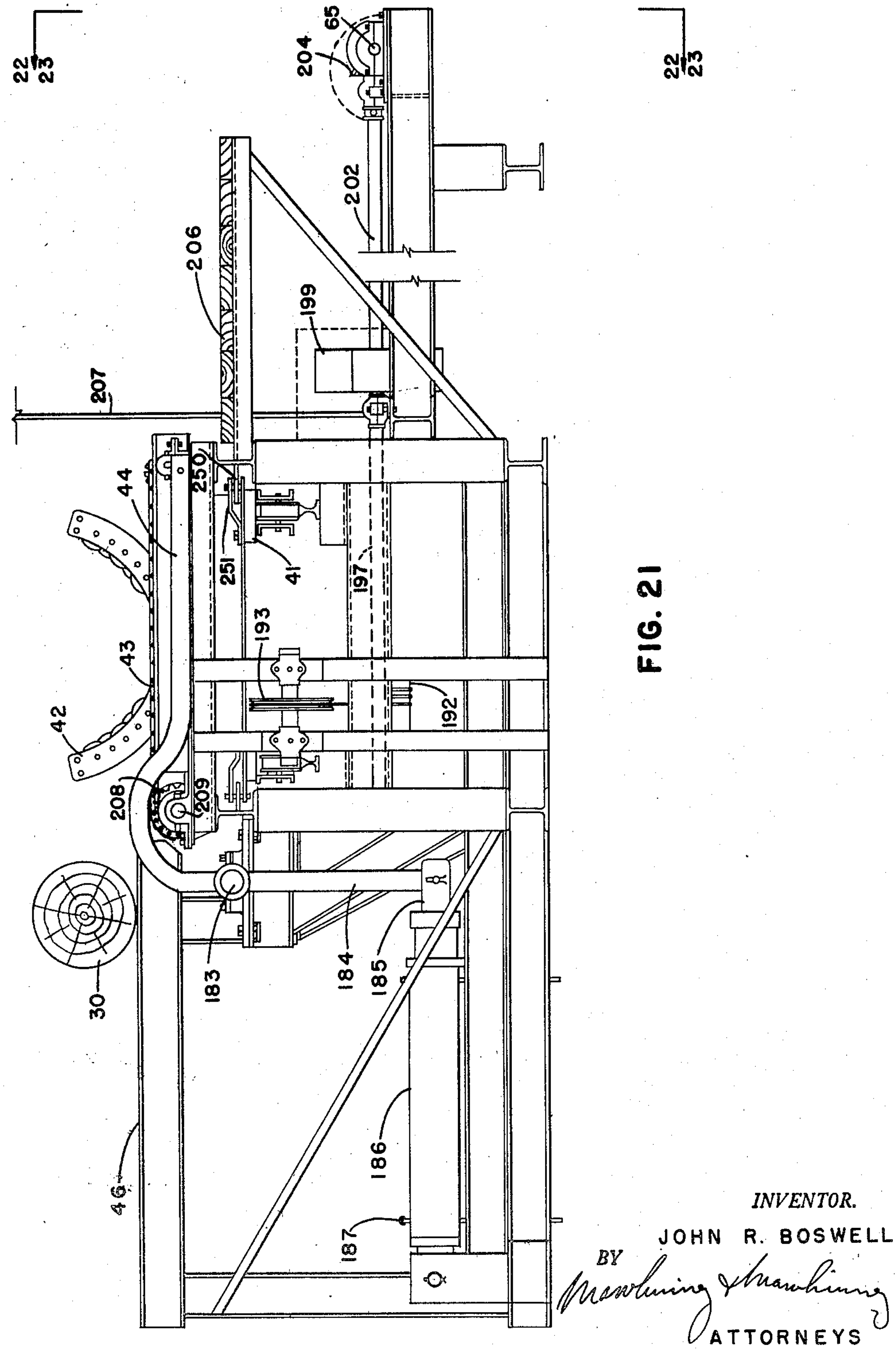
Figure 23:
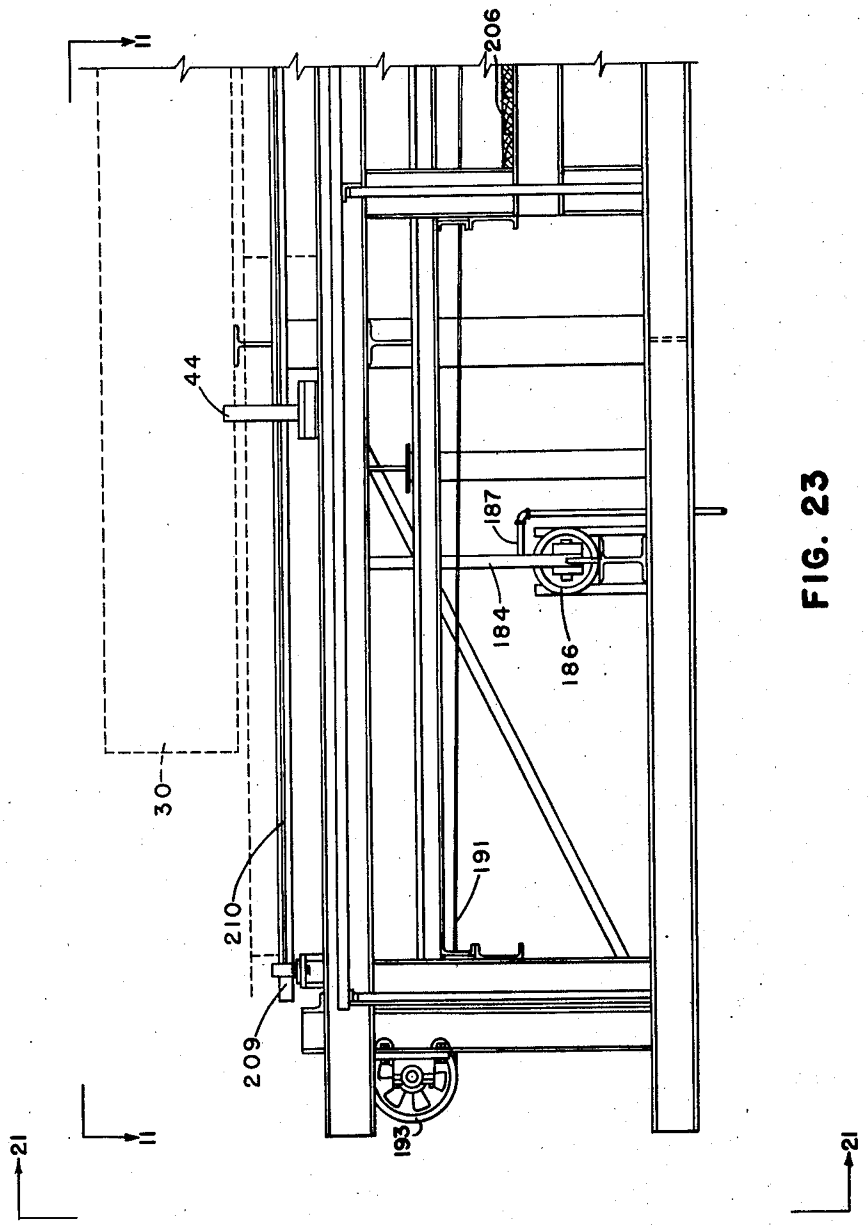

Figure 21 is a left end elevation of the ejecting end, and shows the ejecting mechanism, as it would appear from the viewing lines 21—21 in Figs. 1, 11 and 23.

Figure 10:
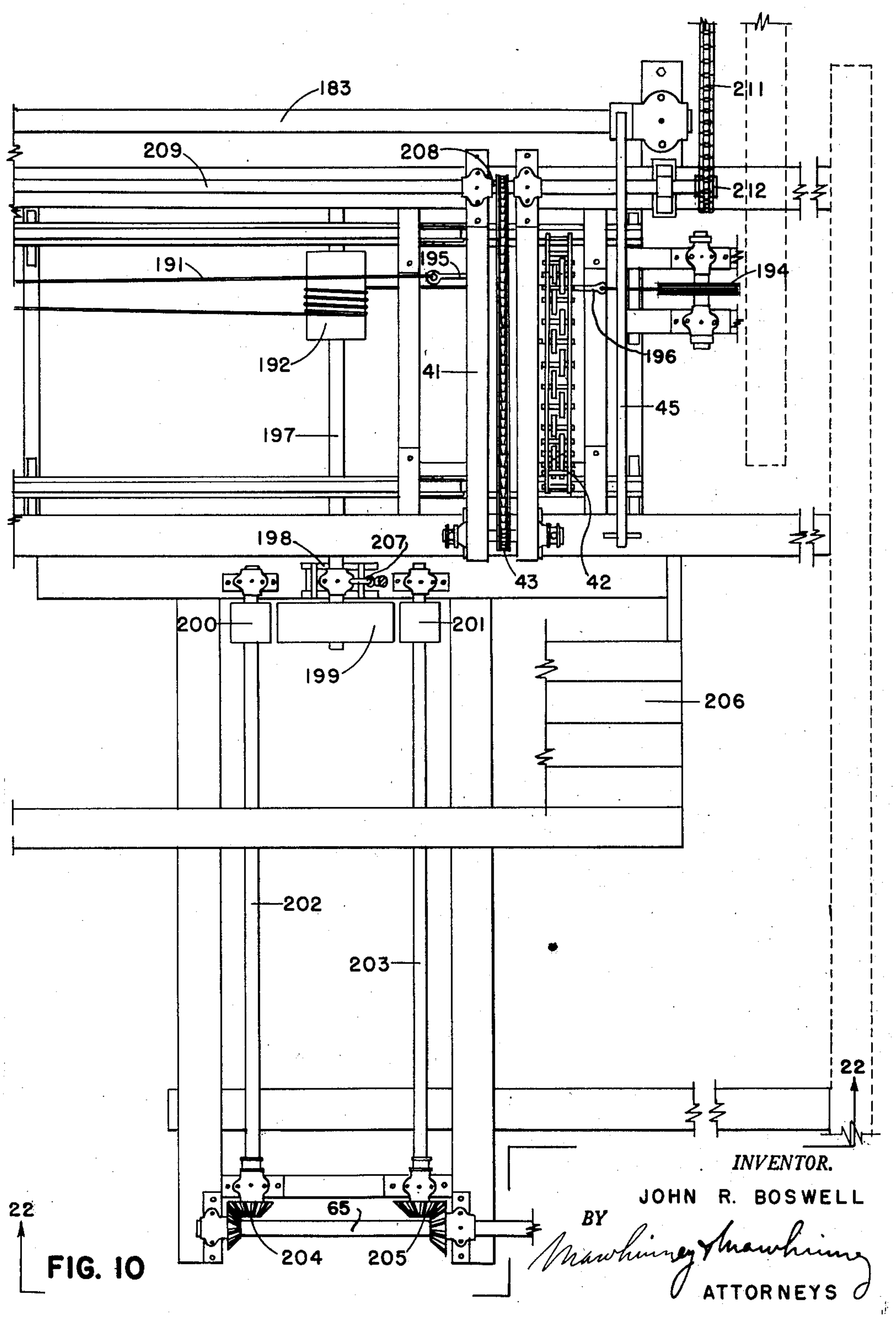
Figure 10 is a top plan view of the outfeed carriage and its drive mechanism, as seen from the viewing line 10—10 in Fig. 22.
Figure 22:
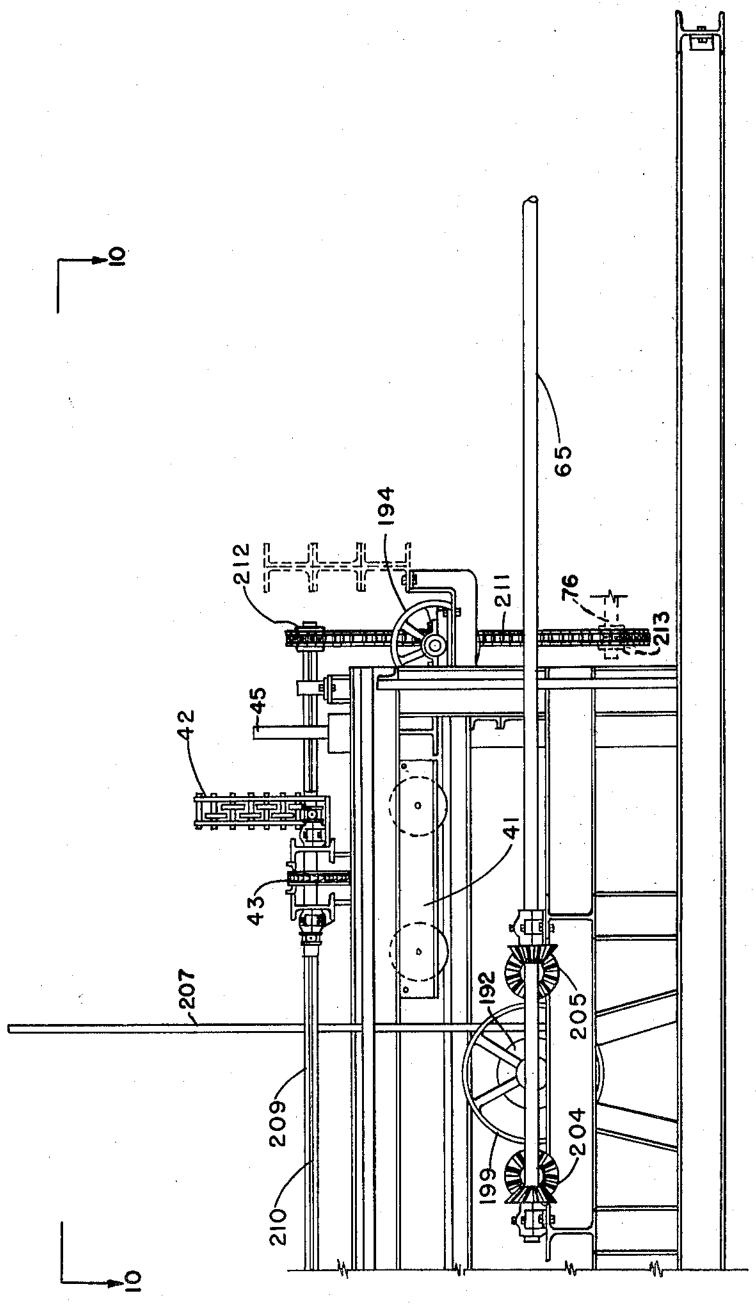

Figure 22 is a fragmentary front elevation of the ejecting end, and shows the carriage and its drive mechanism, as seen from the viewing lines 22—22 in Figs. 1, 10 and 21.

Figure 23 is a continuation of the left hand end of Fig. 22, and shows the structure of Figs. 1, 11 and 21, as seen from the viewing lines 23—23 therein.

Figure 24:
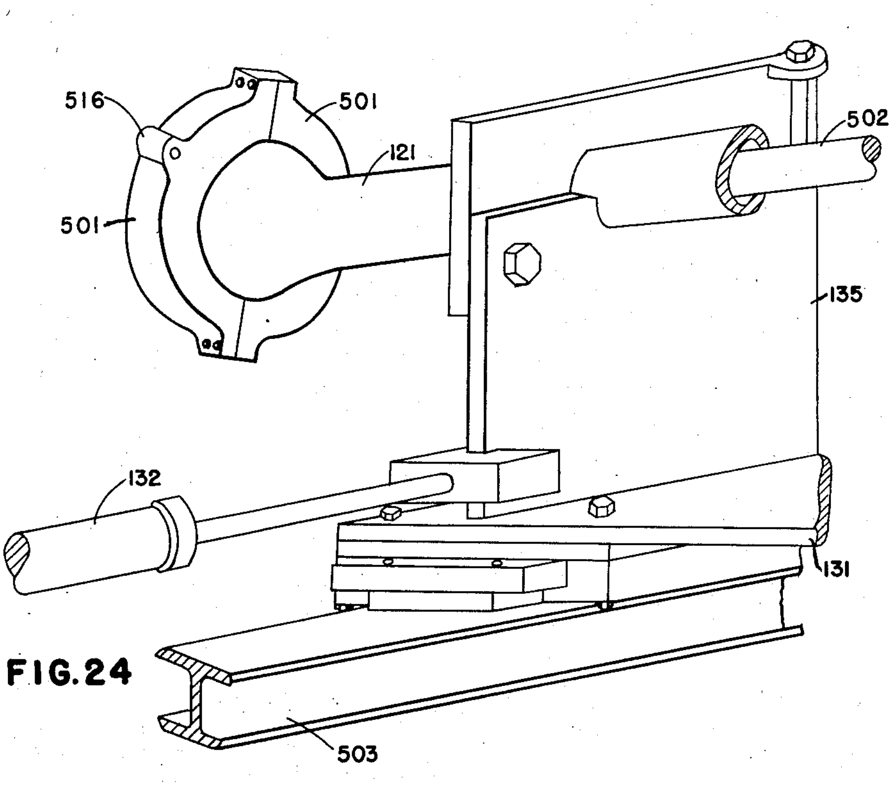

Figure 24 is a fragmentary perspective view of one of the universal wheel mounts for the spur wheels and the rubber or smooth-tired wheels showing also the shaft housing and the connection to the hydraulic cylinder.

Figure 25:
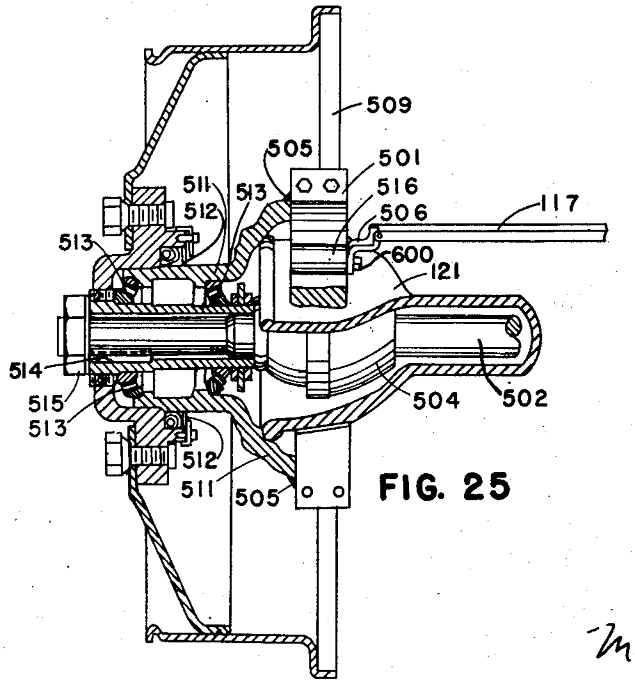
Figure 26:
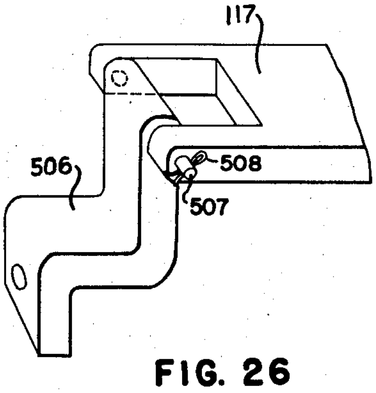

Figure 25 is a sectional view of the wheel and its drive and steering or angular adjustment mechanism, and Figure 26 is an enlarged fragmentary perspective view of the steering or adjusting link and the attaching bracket member.

Referring more particularly to the drawings, the logs 30 which are initially placed upon a supply or storage rack which may be composed of the spaced bars 31 and 32, are drawn forwardly by a cant hook or other implement until the logs descend upon a substantially semi-circular cradle 33 and upon a continuously transversely moving endless chain 34 which imparts a rotary movement to the log in the cradle.

This semi-circular roller cradle 33 and chain 34 are mounted upon a carriage 35 at the infeed side of the machine, which has means to shift the carriage back and forth in a direction axially or longitudinally of the log 30 for the purpose of advancing the log endwise onto a pair of spur wheels 36 and 37 which perform a preliminary debarking operation upon the logs and which spur wheels are universally mounted for angular adjustment so as to effect a spiral feed of the log which in conjunction with infeed travel of the carriage, feeds the log endwise through the machine and past a central debarking station where the log is subject to the flailing action of rotary chains 38 or the like by which the bark, previously loosened by the spur wheels, is completely removed and stripped from the log, provision being made, as hereinafter described for the evacuation and disposal of the stripped bark.

The log 30 is then fed onto a pair of feed wheels 39 and 40 which are preferably rubber tired to prevent injury to the body of the stripped log and which rubber tired wheels are universally mounted for relative angular or canted adjustment whereby they may have a further spiral feed effect on the log, pulling the log through the flailing station and passing such log onto a reciprocating carriage 41 at the opposite side of the machine which is also equipped with a semi-circular roller cradle 42 and with a transversely and continuously driven endless chain 43 whereby the log may be suitably supported, continuously rotated for the same purpose of bringing sequential circumferential areas into accessibility to the flailing chains, and by the outward movement of this second carriage 41 and by the spiral feed to which the log is subjected, such log may be finally brought by the movement of the second carriage 41 to a position above an elevating device which may consist of the elevating arms 44 and 45, which arms may be raised by mechanism hereinafter described or other appropriate mechanism for the purpose of raising the logs onto a final or unloading rack which may consist of the spaced bars 46 and 47.

Referring more particularly to Figures 2, 3, 12, 13A and 13B, the cradle 33 is shown as having free moving rollers 48. In these figures the upper run of the continuously moving chain 34 is shown as occupying a plane higher than the lowest roller 48, this chain 34 being the main source of rotary movement of the log 30.

Figure 12:
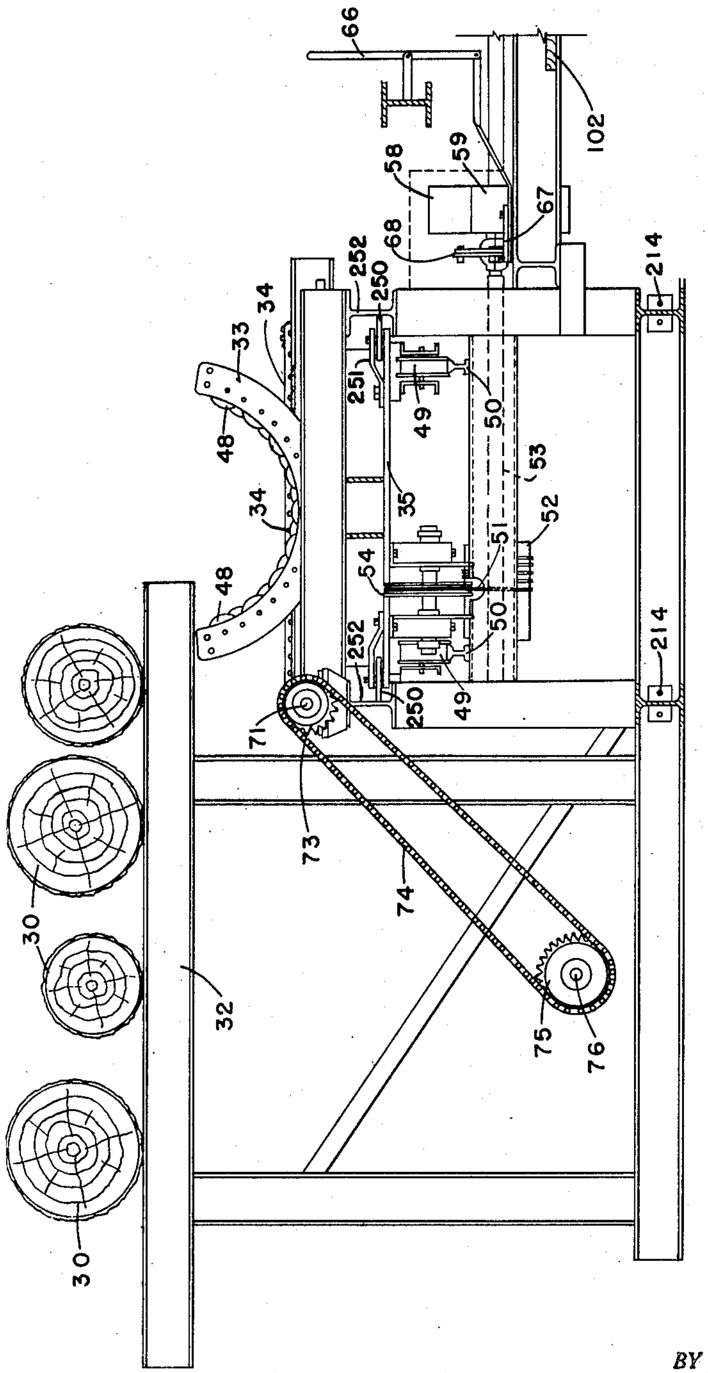
Figure 12 is a vertical transverse section of the supply end of the machine, as indicated by the section line 12 in Fig. 1, and shows logs in place on the supply rack. This view also shows the infeed carriage, as it would appear from the viewing line 12—12 in Fig. 3.
Figure 12A:
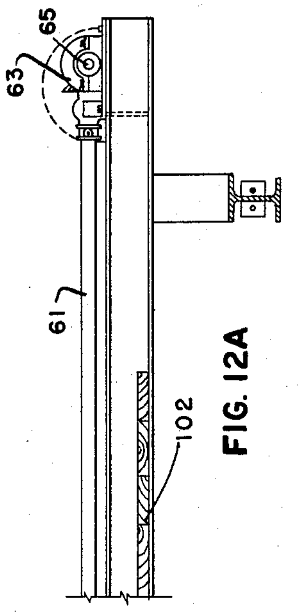
Figure 12A is a continuation of the right-hand end of Figure 12, and is taken on the line 12A—12A in Fig. 3.
Figures 13A, 13B:
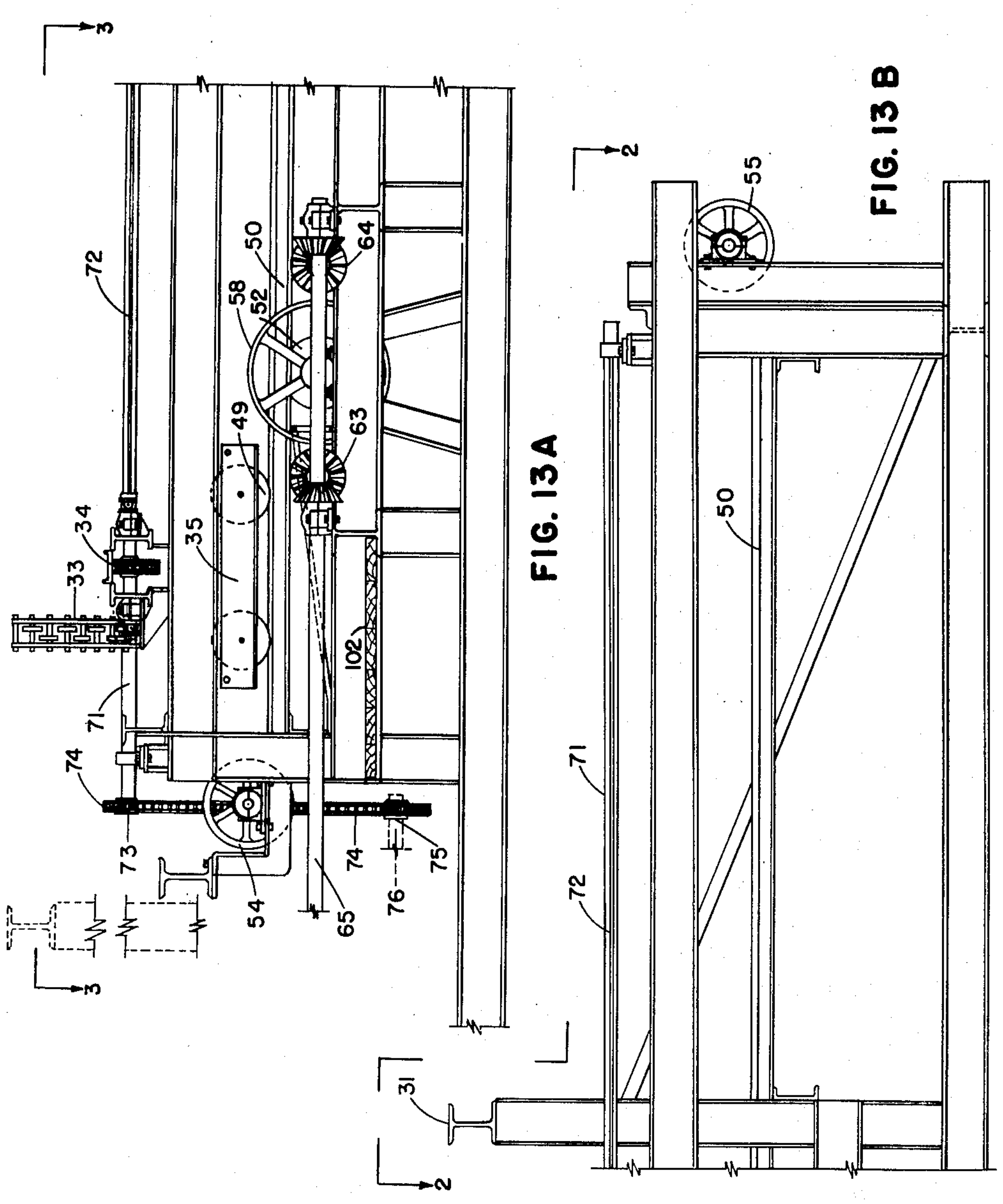
Figure 13A is a fragmentary front elevation of the supply end of the machine, as seen from the viewing line 13A—13A in Fig. 3, and shows the drive mechanism for the infeed carriage and the log rotating chain.
Figure 13B is a continuation of the right hand end of Figure 13A, as seen from the viewing lines 13B—13B in Figs. 1 and 2.

The carriage or wheeled car 35 is supported by wheels 49 which travel on rails or a track 50. In Figure 12, rollers 250 are shown as rotating about vertical shafts mounted in the carriage and in brackets 251, the rollers 250 rotating in contact with beams 252 of the framework. These rollers 250 stabilize the movement of the carriage 35, eliminating side sway and maintaining the carriage on the tracks 50.

The longitudinal movement of the carriage 35 at the receiving side of the frame is accomplished by means of a cable 51 and drum 52 mounted on a shaft 53 supported in appropriate bearings in the machine frame. The cable drum is preferably grooved and the intermediate portion of the cable 51 is wound in a suitable number of turns about this drum with the opposite ends of the cable 51 being brought out from opposite sides of the drum and trained about grooved idler pulleys 54 and 55 at opposite ends of the track 50. The ends of the cable 51 are then brought together and affixed at opposite ends of the carriage 35 as by the use of the eyebolts 56 and 57.

The cable drum shaft 53 has affixed thereto a follower friction wheel 58 and this shaft and friction wheel may be mounted for a lateral swinging movement to bring the follower friction wheel 58 into engagement with either of two driver friction wheels 59 and 60 mounted at substantially diametrically opposite sides of the follower friction wheel 58. The driver wheels 59 and 60 are continuously rotated in opposite directions. The driver friction wheels 59 and 60 are fixed upon shafts 61 and 62 respectively which are driven in relatively opposite directions through two sets of bevel gears 63 and 64 from a shaft 65 which is journaled longitudinally at the front portion of the machine and extends through the intermediate and both side sections of the machine. The adjustment of the follower friction wheel 58 into driving relation with either driver friction wheel 59 or 60 is under the control of a pivoted lever 66 coupled by a bell crank or other linkage 67 and a link 68 to a cradle bearing 69 for the drum shaft 53. The lever 66 may be employed to press the follower friction wheel 58 against either one or the other of the oppositely rotating driver friction wheels 59 or 60.

Thus the grooved cable drum 52 is caused to pull the wheeled car or carriage 35 either in toward the center section of the frame or outwardly away from such center section, such action being under the control of the lever 66.

This longitudinal movement of the wheeled car 35 serves a twofold purpose; in the first place, it acts to shift the log 30 longitudinally; and second, it allows the operator to support the log 30 at a point on the log which will allow a minimum of off-center radial movement at the points of contact with the spur wheels 36 and 37 and the chains 38.

The source of power for this operation is provided through the shaft 65, while the source of power for the rotary chain 34 is provided by a sprocket gear 70 having a spline longitudinally slidable in an axially extending key-way 72 of a shaft 71 (see Fig. 13A), the latter being journaled in appropriate bearings in the receiving end of the machine frame. This arrangement permits the sprocket gear 70 to slide with the carriage back and forth over the shaft 71 while the shaft may impart rotary movement to the sprocket at any position of the sprocket along its length. The inner end of the shaft 71 has affixed thereto a sprocket 73 engaged and driven by a chain or belt 74 which derives its movement from a sprocket 75 mounted on a shaft 76 which extends longitudinally at the rear portion of the frame.

Referring more particularly to Figures 4, 5, 6, 7, 14A, 14B, 15, 16A, 16B, 17 and 18, a pair of spur wheels 36 and 37 are mounted in a central portion of the machine with the space therebetween in alignment with the path of travel of the carriage 35 to receive the log from such carriage in position to bite into the log from opposite sides and to perform a compressing and a breaking of the bark.

These spur wheels have hubs 77 and 78 mounted for universal movement on shafts 79 and 80. These spur wheels 36 and 37 are capable of several different movements. In the first place they are rotatable, secondly they are capable of a horizontal adjustable or swinging movement about vertical axes as indicated by dotted lines in Figure 5, third they are adjustable on their universal supports about horizontal axes as indicated by the dotted lines in Figure 14A, and fourth the spur wheel 36 is movable horizontally toward and from the other spur wheel 37 to enlarge or diminish the gap between the spur wheels proportional to the diameters of logs passing therebetween.

Figure 4:
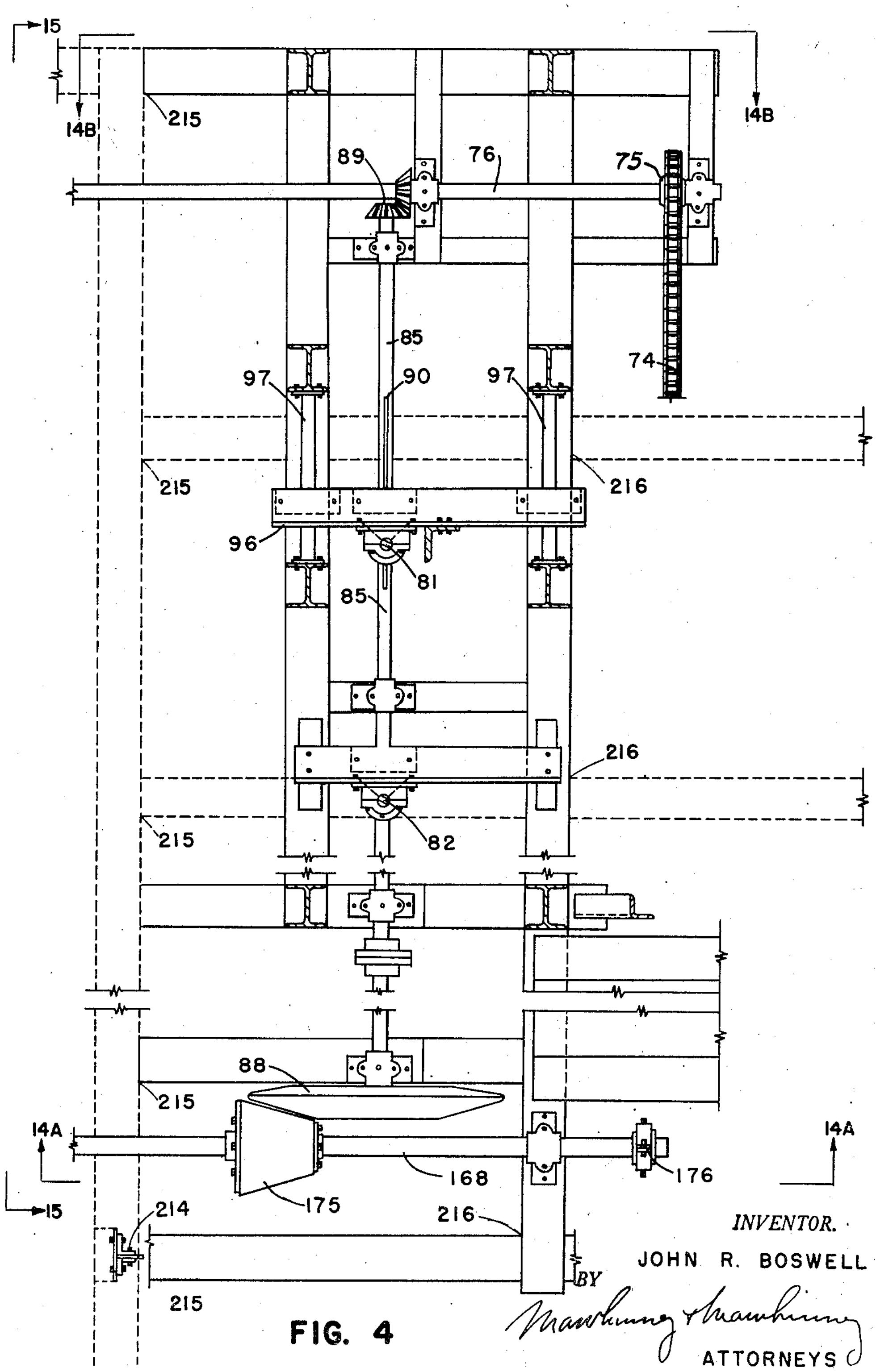
Figure 4 is a top plan view, with parts broken away and parts shown in section, as indicated by the section line 4—4 in Fig. 14A, and shows the drive for both spur wheels and the slidable bed plate mounting for one of the spur wheels.
Figure 5:
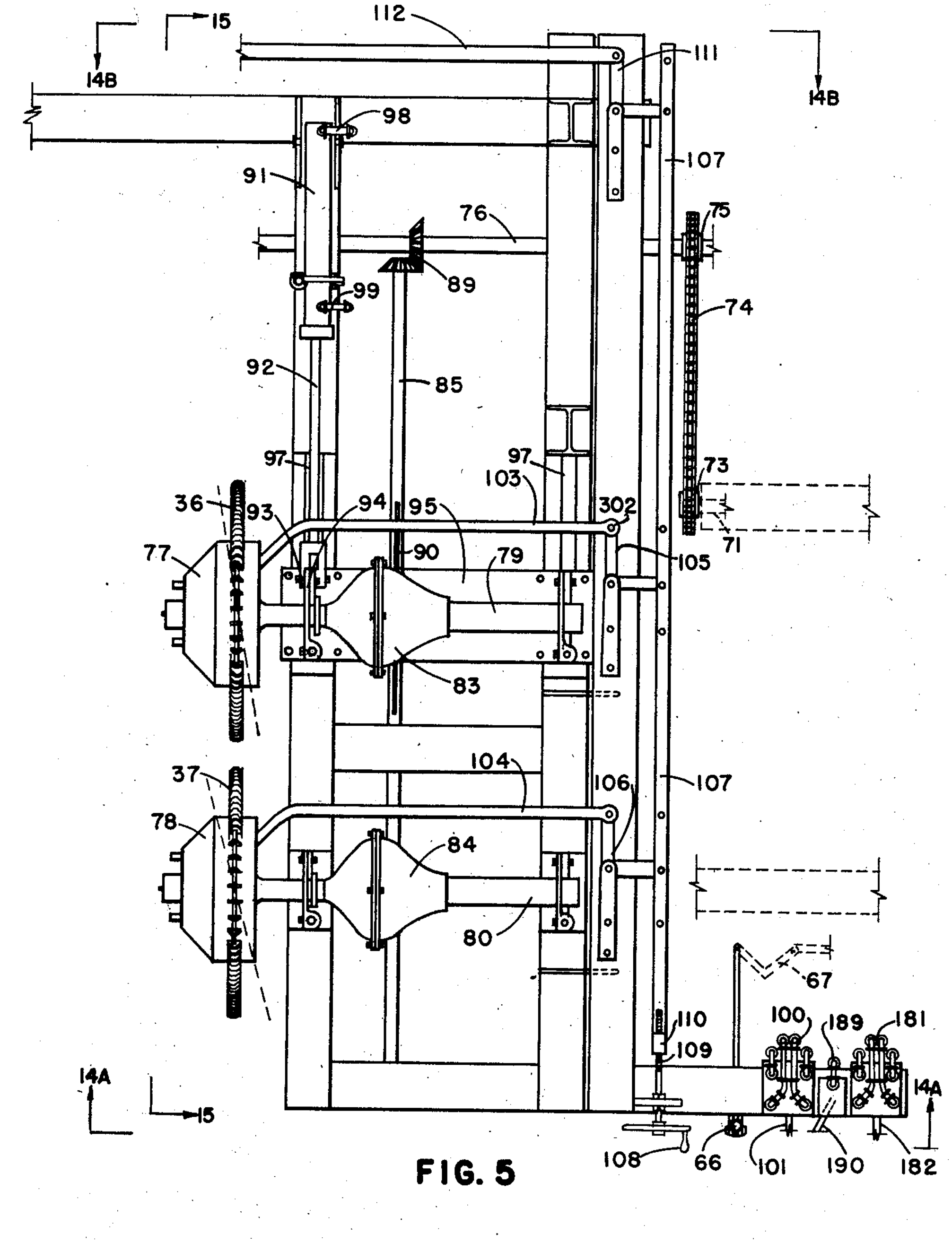
Figure 5 is a top plan view, as indicated by the viewing line 5—5 in Fig. 14A, and adds the superstructure omitted in Figure 4, such as the spur wheels, and the hydraulic means for shifting the slidable spur wheel.

The first movement of the spur wheels 36 and 37, namely the rotational movement, is accomplished through vertical shafts 81 and 82 which are connected to drive the spur wheel shafts 79 and 80 through gear transmissions 83 and 84 of any well-known type. The vertical shafts 81 and 82 are connected at their lower ends to be driven from a horizontal shaft 85 mounted transversely of the machine. Bevel gears 86 and 87 are coupled between the transverse shaft 85 and the two vertical shafts 81 and 82. The transverse shaft 85 has affixed thereto at one end a friction cone 88 (see Figs. 4 and 15), while the other end of said shaft 85 through bevel gears 89 drives a longitudinal shaft 76. A key-way 90 in shaft 85 provides for the lateral movement of the bevel gears 86, the vertical shaft 81 and spur gear shaft 79, thus providing means for the operation of the fourth movement above referred to. This fourth movement, namely the movement of the spur wheel 36 horizontally toward and from the companion spur wheel 37, is accomplished and controlled by a hydraulic ram comprising a cylinder 91 and a ram plunger rod 92 pivoted at 93 to a support plate 94 through which the shaft 79 is journaled at one end portion. The vertical support plate 94 is mounted upon a slidable bed plate 95. As shown in Figure 4 this bed plate is carried upon an angle iron or other support 96 which rides on guides 97. This arrangement also serves to maintain the spur wheel shaft 79 parallel to the stationary companion spur wheel shaft 80. The hydraulic ram 91 is operated through the use of hydraulic fluid, such as oil, which is introduced into, and evacuated from, opposite ends of the cylinder 91 through pipe connections 98 and 99. These pipe connections 98 and 99 connect with pipes 100 the flow through which is controlled by an operating lever 101 on an operator's platform 102 mounted upon the machine at an appropriate location.

With regard to the second and third movements of the spur wheels 36 and 37, such movements are obtained by adjusting the spur wheels in horizontal and vertical intersecting planes about their respective universal supports. This is accomplished by the use of links 103 and 104 which are pivoted to and within the hubs 77 and 78 eccentrically of their centers of rotation. At their other ends these links 103 and 104 are pivotally connected to bell cranks 105 and 106. The bell cranks are pivotally connected also to a slide bar 107 which is moved in and out by any appropriate mechanism under the control of a rotary hand wheel 108 accessible to the operator standing upon the platform 102. In the instance shown the hand wheel 108 rotates a worm and block drive or a screw and nut drive 109 and 110. By turning the wheel 108 in a counter-clockwise direction, the right hand threads of the threaded shaft 109, which is fixed against axial movement, causes the slide rod 107 to be pushed away from the wheel 108. This likewise pushes upon the entrained arms of the bell cranks 105 and 106 to push the links 103 and 104 in the direction of the spur wheels, thereby horizontally canting or tilting the spur wheels 36 and 37 and the hubs 78 and 79 about their vertical axes to the position as indicated by the dotted line in Figure 5. Due to the point of connection of the links 103 and 104 with the hubs 77 and 78 this pushing movement will also cause the spur wheels 36 and 37 to tilt about their horizontal axes in the manner indicated by the dotted line in Figure 14A. The angle at which the spur wheels 36 and 37 are adjusted is controllable to provide wide or close spacing between the spur wheels to the end that the log 30 may be accelerated or retarded in its progress through the spur wheels 36 and 37. It will be understood that this angular disposition of the spur wheels 36, 37 creates a spiral rim movement of the spur wheels on the log 30 and the spacing of the wheels is such that the wheels 36, 37 do not follow one another's tracks but the spiral track made in the bark of the rotating and endwise moving log by one of the spur wheels 36 is between the convolutions of the spiral track made by the other companion spur wheel. The pressure of the spur teeth of the wheels 36 and 37 against the bark tends to break and loosen the bark and thus completes a preliminary debarking operation.

It will also be noted that the same rotary movement of the hand controlled wheel 108 through the slide bar 107 swings an entrained bell crank lever 111 thus pushing upon a longitudinal bar 112 one end of which is pivotally connected to the bell crank lever 111. The bar 112 carries the angular adjusting motion of the spur wheels 36 and 37 to the other side of the machine and to the smooth-tired wheels 39 and 40. The other end of the bar 112 is coupled to a bell crank 113 (see Figs. 9 and 19A) to which is also pivotally connected a slide bar 114. Pivoted to the slide bar are bell cranks 115 and 116 to which are respectively pivoted the links 117 and 118 which extend inwardly and are pivoted to and within the hubs 119 and 120 of the smooth tired wheels 39 and 40. These hubs 119 and 120 are universally mounted upon shafts 121 and 122.

The universal mounting of the spur wheels 36, 37 and of the smooth tired wheels 39, 40 may be of any well-known construction, for instance a ball and socket construction with a spline connection for driving these various wheels while permitting of the angular adjustment of the same. The link arms 117 and 118 are connected to the hubs at a quadrant line between the vertical and horizontal intersecting planes thereof whereby when the link arms 117, 118 are pushed or pulled the entrained wheels will be given a slant or angular movement in both planes simultaneously.

The drive for the smooth tired wheels 39 and 40 may be similar to that described in connection with the spur wheels 36, 37. In other words the wheel shafts 121, 122 are provided with gear transmissions 123, 124 which gear transmissions are connected to be driven from vertical shafts 125, 126 (see Figs. 8, 9 and 20). These vertical shafts are driven from bevel gear couples 127, 128 from a transverse shaft 129. A longitudinal groove 130 in the shaft 129 permits the bevel gear couple 127 to be adjusted longitudinally of this shaft along with the wheel 39. The wheel 39 and its shaft 121 and connected assembly are all mounted for horizontal movement on a bed plate 131 which slides in appropriate ways on the frame of the machine and is so moved by a hydraulic ram comprising a cylinder 132 and plunger rod 133. The plunger rod 133 is pivotally connected at 134 to a plate 135 carried by the adjustable bed plate 131. In this way the wheels 39 and 40 may be adjusted toward and from one another simultaneously with the similar adjustment of the spur wheels 36, 37 to accommodate logs of varying diameters and shapes. The transverse shaft 129 through bevel pinions 136 is driven by the shaft 76.

Referring more particularly to Figures 6, 7, 16A, 16B, 17 and 18, which illustrate the mechanism for the actual debarking of the logs, chains 38, heretofore referred to, are mounted upon a rotating drum 137 in a position substantially centrally of the machine and at one side of the path of the spirally-fed log in its transit from the spur wheels 36, 37 to the smooth-tired wheels 39, 40. The drum is affixed to a shaft 138. The drum 137 and its shaft 138 are rotated by any suitable mechanism, for instance by a sprocket 139 fixed on shaft 138 and receiving its rotation from a chain 140 driven by a sprocket 141 affixed on the main power shaft 142.

As shown particularly in Figure 16A, the chains are of different sizes, the larger chain being pushed to first encounter and strike the bark of the log since the impact of a heavy chain will have more effect than a light one, the light chain or chains following and completing the work. The length of the chains 38 is less than the circumferential distance measured on the periphery of the drum from the point of attachment of the chains to the point of attachment of the same or other chains; this being for the purpose of preventing any mingling of one group of chains with another group. One set or more of the chains may be used but the diameter of the drum 137 is selected to allow a distance on the circumference between the attachment of the chains to exceed the length of the chains which are preferably of the order of one and one-half feet long. The chains 38 are preferably welded to sleeves 143 attached to the drum 137 by a bolt or the like 144. The bolt 144 is removably received through perforated bearing lugs 145 projecting in axially spaced relation along the drum 137. The sleeves 143 are received between the lugs 145. It requires only a minimum time to substitute a new set of chains by the withdrawal of the bolt 144 which may be secured in place in the lugs 145 as by a nut, cotter pin or the like. It is necessary at intervals to renew the chains since the major part of the wear and tear on the debarking machine is centered in the chains 38. In the wintertime, when the bark freezes, or adheres more tightly to the log than in summer, it may be desirable to substitute heavy chains.

When the drum 137 is rotated, the chains 38 hit the log 30 and drag off, causing a hitting, sliding action, which knocks and drags the bark off the logs 30. The chains 38 curve around the logs 30 and the flexibility of the chains 38 allows them to reach every part of the log 30 and into the hollows, and closely about the stubs of limbs and the uneven contours of a knot. Various speeds in the rotation of the drum 137 may be obtained through adjustment of the ratio between the sprocket gears 139 and 141. The faster the drum rotates, the harder will the chains 38 hit the logs 30. Therefore it may be desirable in the wintertime to increase the speed of the drum 137 over that used in the summer time.

Log saddles 146 and 146' help to guide and hold the log 30 in its travel in front of the drum 137 and to prevent the log 30 from making a direct contact with the drum 137.

The bark which is stripped from the log falls into a hopper 148 and onto a conveyor 147 which moves in the lower portion of the hopper and through a trough 149. The conveyor 147 runs over sprockets 150 and 151 at an elevation and discharges the removed bark into a bin indicated at 152 located at the front of the machine.

Figure 6:
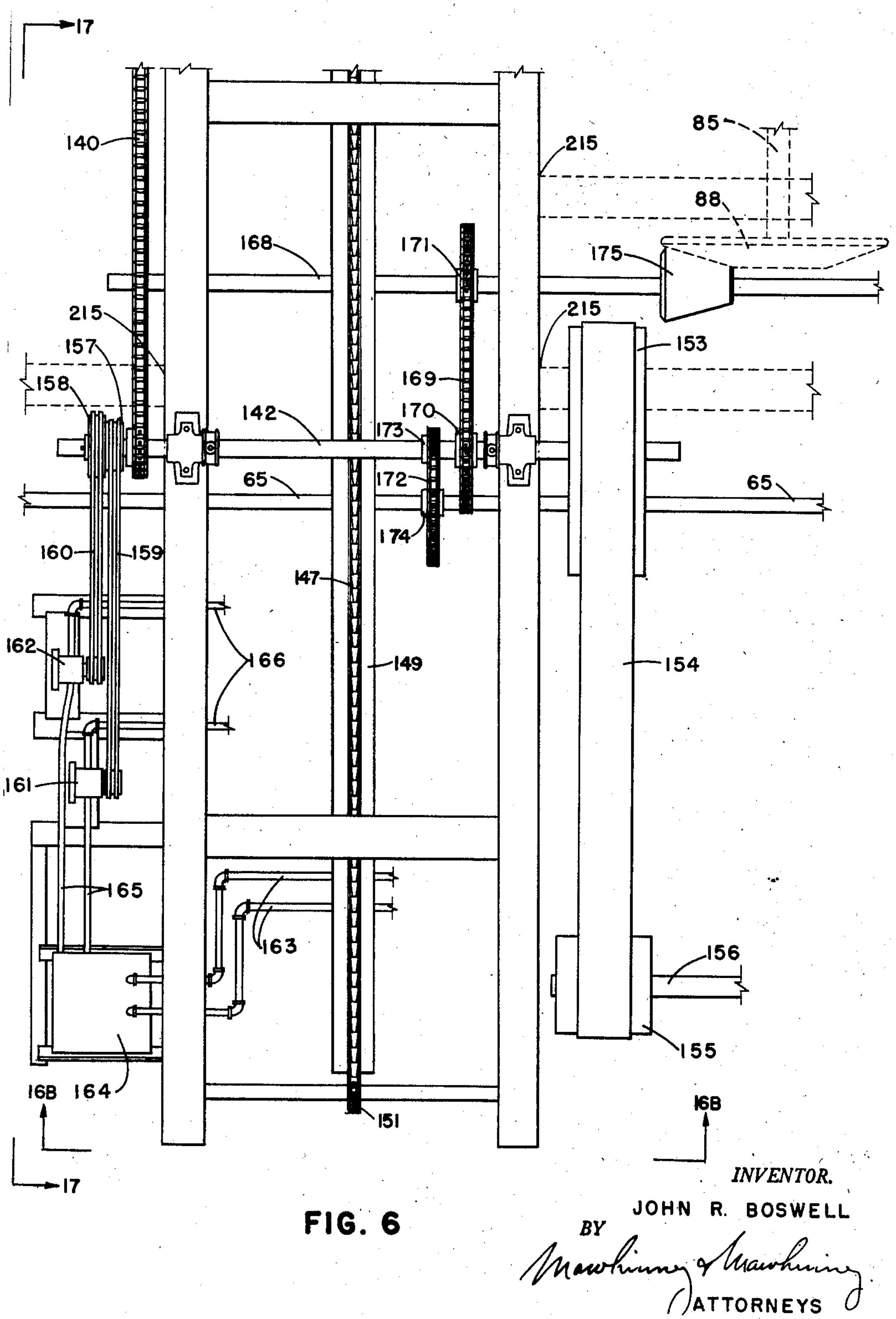
Figure 6 is a plan view showing the mechanism for driving the hydraulic pumps, as seen from the viewing line 6—6 in Fig. 16B.

Referring more particularly to Figure 6 the entire source of power for the whole machine is or may be centered in the main drive shaft 142. Affixed to such shaft is a fly wheel 153 over which runs a belt 154 receiving power from a pulley 155 fast on a shaft 156 which is driven from any suitable power source, such as a diesel engine, steam engine or the like. Thus from the original source of power the shaft 156 rotates the pulley 155, drives belt 154 which in turn rotates the fly wheel 153 and drives the main shaft 142. Through the chain drive 140 the shaft rotates the drum 137 and continuously drives the chains 38.

On the main drive shaft 142 are also pulleys 157 and 158 connected by belts 159 and 160 to driven pulleys on geared oil pumps 161 and 162. Such pumps thus circulate oil through the hydraulic system. Oil pipes 163 return oil to an oil sump 164, and pipes 165 lead the oil from the sump 164 to the pumps 161 and 162. The pipes 166 deliver oil from the pumps to the controls on the platform 102. One of these controls 101 has already been described.

The conveyor chain 147 is also driven continuously by sprocket gear 167 mounted on shaft 168. Such shaft 168 is driven from the main drive shaft 142 by a belt or chain 169 engaged with a sprocket 170 on the main drive shaft 142 and with a sprocket 171 on the shaft 168.

The shaft 65 is also driven from the main drive shaft 142 by chain or belt connection 172 trained over sprockets 173 and 174 on the shafts 142 and 65 respectively. The shaft 65 furnishes power for driving the wheeled cars or carriages 35 and 41.

It will be further apparent from Figure 6 that the shaft 168 has fixed thereon a driving cone 175 in engagement to drive the friction cone 88 on the shaft 85. The shaft 168 is slidable in its bearings in order to move the cone 175 into and out of engagement with the driven cone 88. A lever 176 pivoted at 177 on or near the platform 102 is coupled to the shaft 168 at 178 (see Fig. 14A). By swinging the lever 176 the cone 175 may be made to engage and disengage the driven cone 88.

When the lever 176 is in a substantially vertical position the friction cone 175 is moved away from the driven friction cone 88 and the shaft ceases to rotate. When the lever 176 is moved to the right, the friction cone 175 is engaged in driving relation with the cone 88 and the shaft 85 is thereby caused to rotate. Rotation of the shaft 85 through the bevel gear 89 drives the shaft 76 and through the belt or chain connection 74 drives the shaft 71 which rotates the sprocket 70 continuously driving the endless chain 34.

The shaft 76 also extends over to the opposite side of the machine and drives the similar chain 43 on the carriage 41 at the ejecting side of the machine.

Referring more particularly to Figures 8, 9, 19A, 19B and 20, the wheels 39 and 40 are shown as equipped with pneumatic rubber tires similar to automobile tires, the same being universally mounted for angular adjustment relatively to their shafts 121 and 122. The angular adjustment of the smooth-tired wheels 39 and 40 accompanies the angular movement of the spur wheels 36 and 37 as hereinbefore described. The same control wheel 108 operates to adjust both the spur wheels 36, 37 and the smooth-tired wheels 39, 40 through the slide bar 107, bell crank 111, movable bar 112, bell crank 113, slide bar 114, bell cranks 115 and 116 and the link arms 117, 118. Since the smooth-tired wheels 39, 40 and the spur wheels 36, 37 face each other, it will be understood that the link arms 103, 104 and 117, 118 work oppositely, the link arms 103, 104 pushing the spur wheels 36, 37 while the link arms 117, 118 pull upon the smooth-tired wheels 39, 40 to achieve the identical angle of pitch or rake desired in both sets of the wheels 36, 37 and 39, 40 as indicated by the dotted lines in Figures 5, 9, 14A, and 19A.

As hereinbefore described, the smooth-tired wheel 39 is adjustable horizontally toward and from its companion smooth-tired wheel 40 by operation of the hydraulic ram 132, 133 the cylinder 132 of which has pipes 179 and 180 connected with opposite ends thereof and leading to supply pipes 181 under the control of a valve lever 182 mounted on the platform 102 adjacent the lever or hand valve 101 for controlling the hydraulic ram 91, 92 which controls the like movement of the movable spur wheel 36.

The smooth-tired wheels 39, 40 are given positive rotary motion through the drive connections already described and when these wheels are angularly positioned with respect to the log axis, they tend to pull the log through the machine. In other words these rotary and angularly arranged smooth-tired wheels 39, 40 assist the turning and the longitudinal movement of the log 30 past the chain drum 137. It is important that this longitudinal movement of the log 30 is not stopped because such stoppage would result in injury to the log. Tests have proven that the chains 38 on the drum 137 will cut a log in two pieces in substantially the space of a minute if the log is stopped in its motion through the machine.

Figures 10, 11, 21, 22 and 23 illustrate the left side of the machine, which is also called the discharge or ejecting side. This left side is similar to the right side of the machine in the use of the carriage 41, cradle 42 and transversely moving endless chain 43. Additionally this left side of the machine is equipped with lifting bars 44 and 45 mounted upon a rock shaft 183 journaled in bearings at the rear portion of the left side of the machine just below the front ends of the discharge rack bars 46, 47. The shaft 183 is given a rocking motion through an arm 184 pivoted to the plunger rod 185 of a hydraulic ram the cylinder of which is indicated at 186. Oil or other hydraulic fluid is furnished under control to opposite ends of the cylinder 186 through the pipe connections 187 and 188. These pipes are fed from a pipe line 189 (see Figs. 5 and 14A under the control of a valve or lever 190 on the platform 102. The lift bars 44, 45, when operated, lift the log 30 up and place the same upon the beams 46, 47 which form the discharge rack. The stripped logs are removed from this discharge rack by any appropriate means.

The longitudinal movement of the wheeled car or carriage 41, which carries the roller cradle 42 and the endless transversely moving chain 43, is accomplished through the movement of a cable 191 having its intermediate portion wound about a grooved or other drum 192. The cable 191 runs over idler pulleys 193 and 194 and the terminal ends of the cable are affixed to opposite ends of the carriage 41 as by the use of eyebolts 195, 196. The drum shaft 197 has a rocking bearing 198 and carries a friction wheel 199 adapted to be moved selectively into engagement with either of two friction drive pulleys 200 and 201 mounted on shafts 202 and 203 respectively which are driven in relatively opposite directions through the bevel gear couples 204 and 205 from the longitudinal shaft 65 which also drives the carriage at the supply side of the machine. A second platform 206 is provided at the left side of the machine for a second operator who may control the directional movement of the carriage 41 by a lever 207.

The transverse endless chain 43 is driven by a sprocket 208 from a shaft 209 having a key-way 210 (see Fig. 22) for receiving a spline or key of the sprocket 208 to permit sliding movement of the sprocket 208 along the shaft 209 with the carriage 41 and at the same time to enable the shaft 209 to continuously drive the sprocket 208 and the chain 43.

The shaft 209 is rotated by means of a chain 211 which engages a sprocket 212 on the inner end of the shaft 209 and a sprocket 213 on the longitudinal shaft 76 which drives a shaft 71 at the supply side of the machine through a similar belt or chain drive 74.

The frame of the machine as shown in the drawings consists almost entirely of H-iron welded together except where indicated by bolts 214 and by the numerals 215, 216 and 217. However other material may be used, the type of material being limited by the strength thereof.

Figure 8:
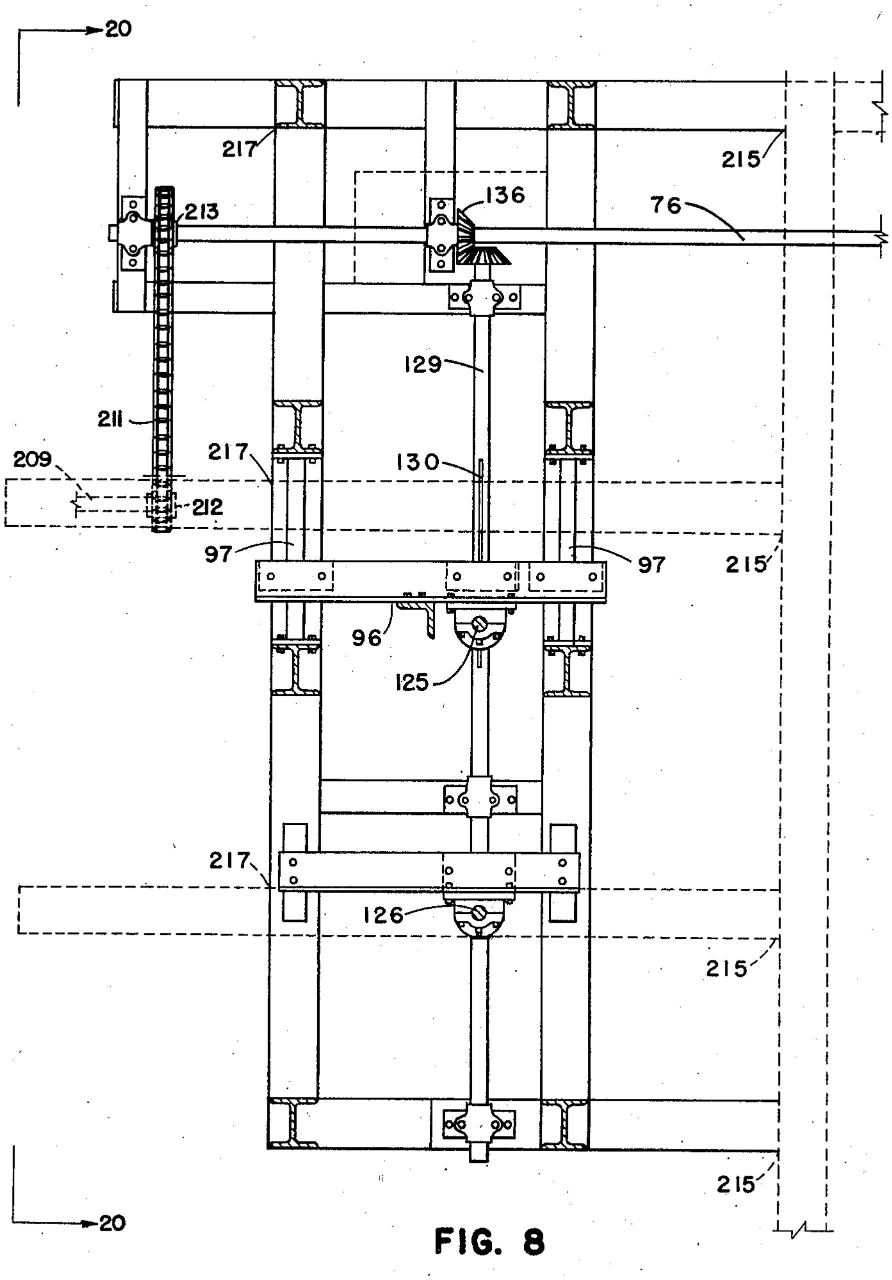
Figure 8 is a horizontal section similar to Figure 4, but is taken at the other side of the central portion of the machine, as indicated by the section line 8—8 in Fig. 19B, and shows the drive for the smooth-tired wheels and the slideway for one of such wheels.

The dismantling of the machine is had by the removal of the bolts 214 at the points indicated by 215, 216 and 217. The numeral 215 indicates the points of detachment at the center section which may be seen in Figures 4, 6, 7 and 8. Numeral 216 indicates the points of detachment on the right side and may be seen in Figure 4; while 217 indicates the left side detachment as seen in Figure 8.

The shaft 65 (Figures 3, 6 and 10) which extends in common to the center and both side sections of the machine must of course be removed prior to dismemberment of the machine. The same is true of the shaft 168 (Figures 4 and 6), and the shaft 76 (Figures 4, 7 and 8). The removal of these shafts also entails the removal of some of the belts, pulleys and bevel gears. The bar 112 which connects the bell cranks 111 and 113 must also be removed. When such dismantling operation is finally accomplished, five separable sections result which sections are indicated at 218, 219, 220, 221 and 222.

It will be appreciated from the foregoing that the improved apparatus will have a high productive capacity in debarking timber with flexibility able to meet varying conditions of use.

The presence of bark on wood slabs and in sawdust resulting from saw milling operations renders such materials unsuitable for most purposes and the burning or discarding of vast quantities of slabs and sawdust represents a tremendous waste of natural resources and a loss to tree farmers and to manufacturers. In spite of numerous attempts to solve this problem the waste continues and is especially heavy at the smaller units which account for the bulk of the production. The present machine and method of operation accomplishes the debarking with an apparatus of simple design so constructed that it may be installed at small mills, for example mills in the woods handling less than twenty thousand feet of lumber daily.

It will also be appreciated that the improved mechanism will perform efficiently without being an expensive permanent installation or permanent part of the saw milling plant.

It will further be appreciated that the improved machine will permit the efficient debarking of logs of varying thickness with accommodation for taper, knots and reasonable natural crook.

It will also be appreciated from the foregoing that due to the novel design of the machine and the combination and relationship of elements, the debarking is accomplished without undue shock and the machine is assured of a long period of serviceability. The speed of operation of the machine is subject to ready control assuring the most efficient removal of bark from each piece passing through the equipment.

The debarking is accomplished by a unit that combines a biting and stripping action by a rapidly rotating member, avoiding cutting of the wood and being of sufficiently flexible design and construction to handle logs of varying sizes while the rotating member remains the same. The principle of operation involved provides for smooth operation and long life of the debarking machine.

The bark itself has value because of its chemical constituency and because of its insulating possibilities. The logs are more valuable if the bark can be removed at reasonable cost because it is easier to cut good lumber from a log which is entirely free of bark and furthermore paper mills are willing to buy slabs and edging strips and trimmings provided they are entirely free of bark.

It is to be emphasized that the machine will not only strip straight logs but will also operate as efficiently upon crooked logs. In the case of very big logs the chains will knock the bark off a log and such chains may be spaced at different intervals or there can be several drums with such chains.

A bark free log will enable one to take a straight log and cut off an outside slab which could then be dried and made into a form of siding. This would follow the contour of the wood and would make log cabin siding.

It is also to be noted that the machine will be equipped with appropriate shields at various points to protect the workmen. For instance a shield will be so placed as to protect the attendant from the flailing chains should one of the chains break.

It will be understood that the device for angularly adjusting the spur wheels and the rubber-tired wheels may be of that usual form employed upon automobiles or other vehicles for angularly turning the front wheels thereof for purposes of steering. One such arrangement is shown in Figures 24, 25 and 26 in which a shaft 502 for driving the wheel extends through a bell housing 121. The steering yoke is indicated at 501 and the universal joint at 506. The steering yoke 501 is welded to the steering knuckle body 511 by a weld indicated at 505. A bracket 506 is bolted at 600 or otherwise secured to a boss 516 of the steering yoke 501 and has an offset portion to which is connected a link 117 as by means of a pivot pin 507 held in place removably by a cotter key 598 or the like.

The wheel rim is designated at 509. Appropriate packing 512 is supplied as usual together with roller bearings 513 between the shaft and the steering knuckle body 511. A key 514 constitutes a driving connection between the shaft 502 and the wheel. A shaft retaining nut 515 is mounted on the shaft to retain the hub of the wheel and other parts in place.

The hydraulic cylinder 132 is shown as connected to the wheel mount 135 for purposes already described.

Figure 14A:
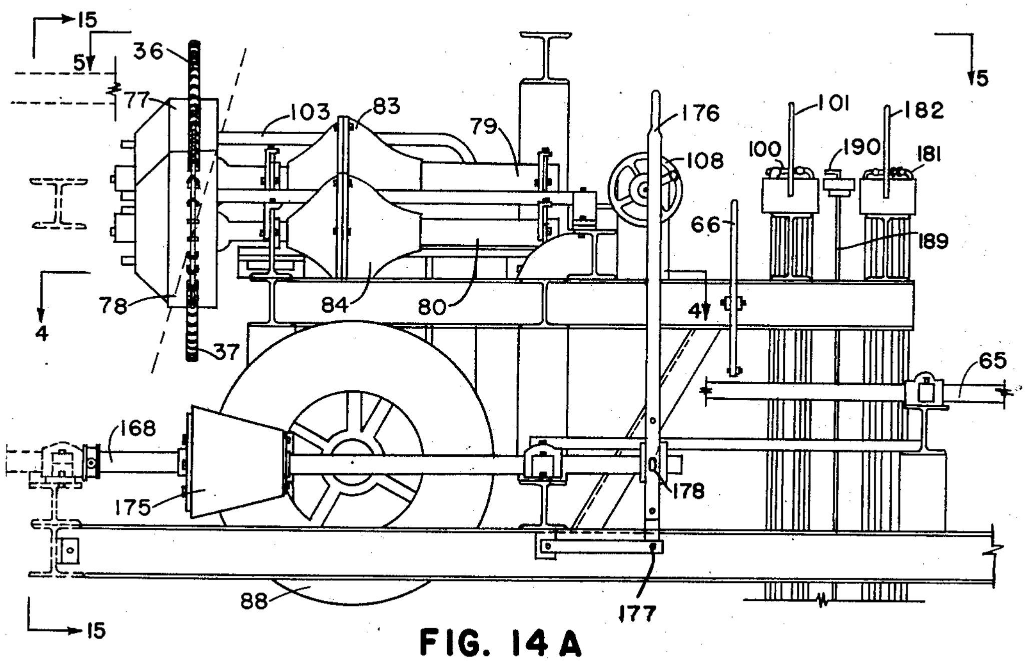
Figure 14A is a fragmentary front elevational view, showing the spur wheels and their associated drive mechanism, as seen from the viewing lines 14A—14A in Figs. 1, 4, 5 and 15.
Figure 14B:
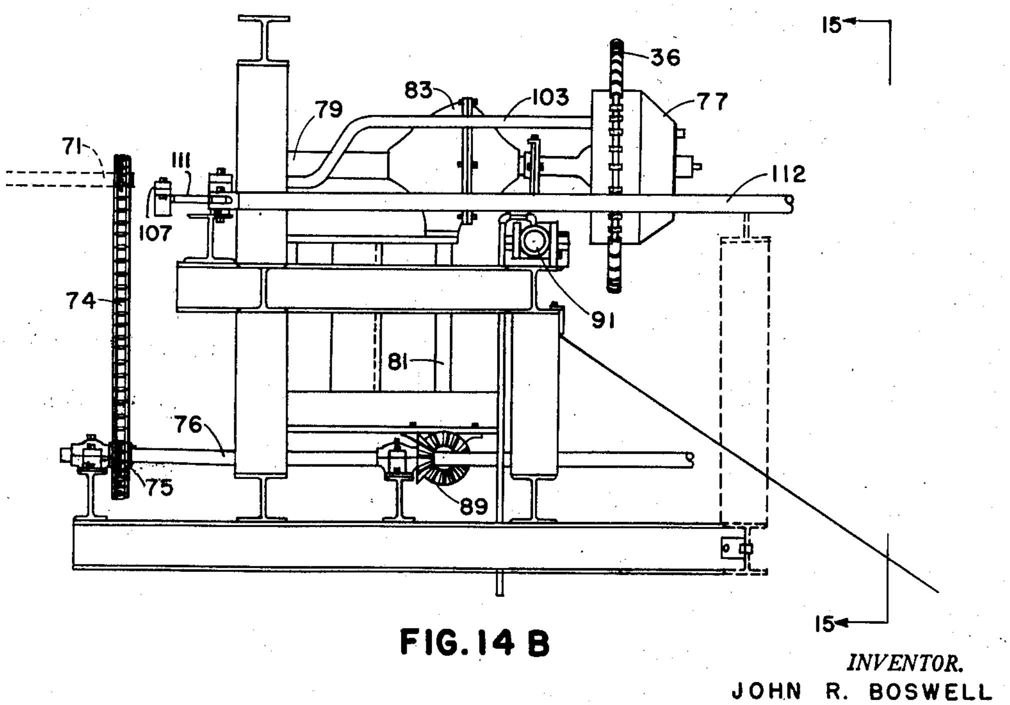
Figure 14B is a fragmentary rear elevation, and shows the opposite side of the structure of Figure 14A, as seen from the viewing lines 14B—14B in Figs. 4 and 5.
Figure 15:
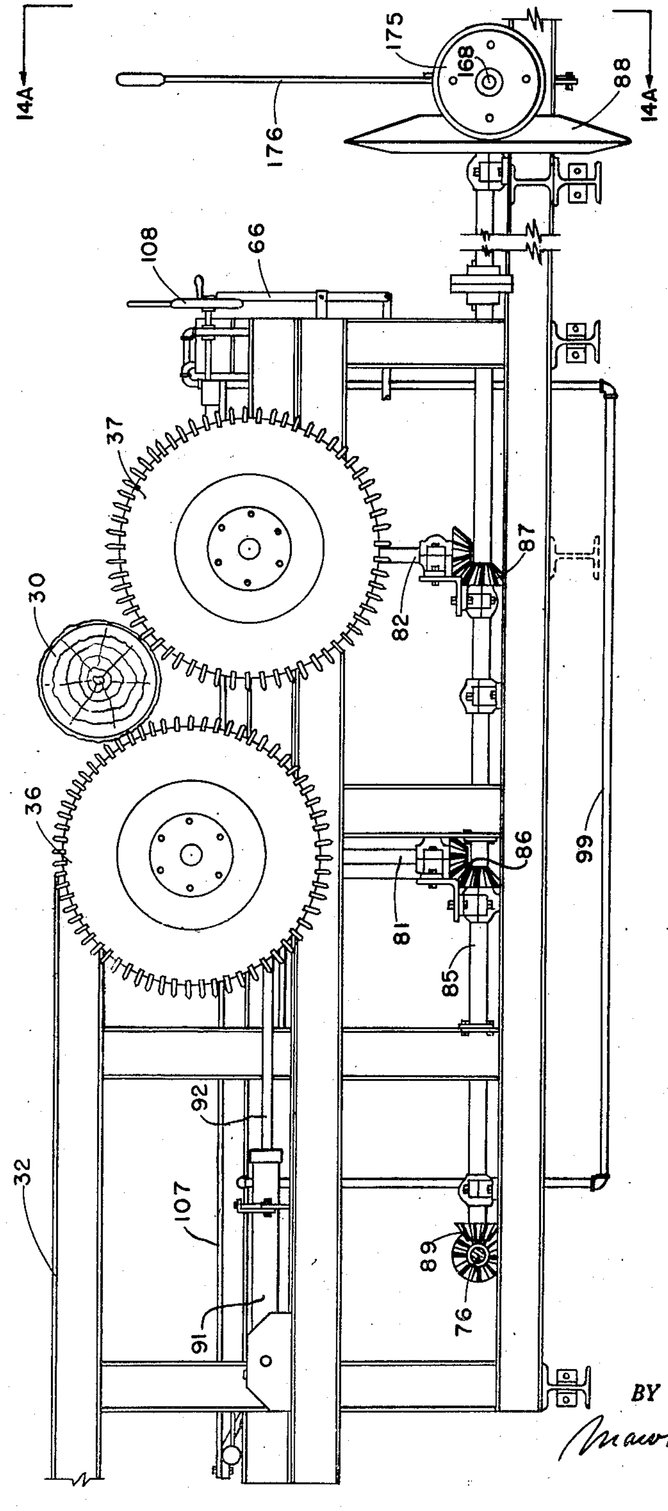
Figure 15 is a transverse section taken on the section line 15 in Fig. 1, looking endwise at the two spur wheels and their drive mechanism, as also seen from the viewing lines 15—15 in Figs. 4, 5, 14A and 14B, and showing a log in operative position on the spur wheels.

It will be noted in Figure 14A that the friction cone 88 extends beneath the bottom of the supporting frame, as does pipe in Figure 15 and sprocket 159 in Figures 16A and 18. The machine may be placed at an elevation on suitable supports or excavation 225 may be made in the ground on which the machine rests between H-iron support beams 223 and 224 which are indicated in Figures 7 and 18 and appropriate excavation may be made beneath other portions of the machine.

Although I have disclosed herein the best form of the invention known to me at this time, I reserve the right to all such modifications and changes as may come within the scope of the following claims.

What is claimed is:

1. In a log debarking machine, first and second movable carriages spaced apart at opposite sides of said machine, means for moving said carriages, means on said carriages for rotating a log supported thereon and moving therewith, a pair of universally mounted feed wheels for receiving the logs from the first carriage, means for adjusting the angle of rake of said feed wheels, smooth surfaced wheels universally mounted in spaced relation to said feed wheels and positioned to receive the log therefrom and to pass the log onto said second carriage, and a debarking device between said feed and smooth surfaced wheels constructed and positioned to remove the bark from the log.

2. In a log debarking machine, first and second movable carriages spaced apart at opposite sides of said machine, means for moving said carriages, means on said carriages for rotating a log supported thereon and moving therewith, a pair of universally mounted feed wheels for receiving the logs from the first carriage, means for adjusting the angle of rake of said feed wheels, smooth surfaced wheels universally mounted in spaced relation to said feed wheels and positioned to receive the log therefrom and to pass the log onto said second carriage, means for adjusting the angle of rake of said smooth surfaced wheels, and a debarking device between said feed and smooth surfaced wheels constructed and positioned to remove the bark from the log.

3. In a log debarking machine, first and second movable carriages spaced apart at opposite sides of said machine, means for moving said carriages, a pair of universally mounted feed wheels for receiving the logs from the first carriage and rotating said logs, means for adjusting the angle of rake of said feed wheels, smooth surfaced wheels universally mounted in spaced relation to said feed wheels and positioned to receive the log therefrom and to pass the log onto said second carriage, means for driving said feed and said smooth surfaced wheels, means for adjusting the angle of rake of said smooth surfaced wheels, and a debarking device between the feed and smooth surfaced wheels constructed and positioned to remove the bark from the log.

4. In a log debarking machine, first and second movable carriages spaced apart on said machine, means for moving said carriages, a pair of universally mounted feed wheels for receiving the logs from the first carriage and rotating said logs, means for adjusting the angle of rake of said feed wheels, smooth surfaced wheels universally mounted in spaced relation to said feed wheels and positioned to receive the log therefrom and to pass the log onto said second carriage, means for driving said feed and said smooth surfaced wheels, means for adjusting the angle of rake of said smooth surfaced wheels, and a flailing device between said feed and smooth surfaced wheels constructed and positioned to remove the bark from the log.

5. In a log debarking machine, first and second movable carriages spaced apart on the machine, means for moving said carriages, a pair of universally mounted primary feeding wheels for receiving the logs from the first carriage and rotating said logs, means for adjusting the angle of rake of said primary feed wheels, secondary feed wheels universally mounted in spaced relation to said primary feed wheels and positioned to receive the log from said primary feed wheels and to pass the log onto said second carriage, means for driving said primary and said secondary feed wheels, means for adjusting the angle of rake of said secondary feed wheels, and a debarking device between said primary and secondary feed wheels constructed and positioned to remove the bark from the log.

6. In a log debarking machine, first and second movable carriages spaced apart on the machine, means for moving said carriages, a pair of universally mounted primary feed wheels for receiving the logs from the first carriage and rotating said logs, a pair of universally mounted secondary feed wheels in spaced relation to said primary feed wheels and positioned to receive the log from said primary feed wheels and to pass the log onto said second carriage, means for driving said primary and said secondary feed wheels, means for simultaneously adjusting the angle of rake of both said primary and secondary feed wheels, and a debarking device between said primary and secondary feed wheels constructed and positioned to remove the bark from the log.

7. In a log debarking machine, first and second movable carriages spaced apart on the machine, means for moving said carriages, universally mounted primary feed means for receiving the logs from the first carriage and rotating the logs, means for adjusting the angle of rake of said primary feed means, secondary feed means universally mounted in spaced relation to said primary feed means and positioned to receive the log from said primary feed means and to pass the log onto said second carriage, means for driving said primary and said secondary feed means, means for adjusting the angle of rake of said secondary feed means, and a debarking device between said primary and secondary feed means constructed and positioned to remove the bark from the log.

8. In a log debarking machine, a pair of universally mounted spur wheels for spirally feeding a log and performing a preliminary debarking operation, a flail positioned to strike the bark of the log as it is fed from said spur wheels for debarking the log, and smooth surfaced universally mounted wheels positioned to receive the debarked log from the flail, means for driving said spur and said smooth surfaced wheels, and means for adjusting the angle of rake of said spur and smooth surfaced wheels.

9. In a log debarking machine, universally mounted spur wheels for receiving a log therebetween, feeding the log spirally therethrough and performing a preliminary debarking operation upon the log, a flail positioned to strike the log fed through said spur wheels and comprising a heavy flailing member and a light flailing member arranged in the order that the heavy flail member first encounters the log to impose heavy blows upon the spur wheel treated bark with the light flail member subsequently acting to strip the bark from the log, smooth surfaced wheels universally mounted in substantial alignment with spur wheels at the opposite side of said flail for receiving the debarked log therebetween and continuing to feed the log spirally past the flail, means for driving said spur and said smooth surfaced wheels, and means for adjusting the angle of rake of said spur and smooth surfaced wheels.

10. In a log debarking machine, universally mounted spur wheels, universally mounted smooth surfaced wheels spaced from and in substantial alignment with said spur wheels, means for adjusting the angle of rake of said spur and smooth surfaced wheels, means for driving both said spur and smooth surfaced wheels to feed a log spirally therethrough, a flail between said spur and smooth surfaced wheels mounted to rotate transversely of the log and comprising heavy and light-weight flail members with the heavy members adjacent said spur wheels, and means for rotating said flail.

11. In a log debarking machine, a pair of spur wheels for receiving a log therebetween and mounted to rotate in relatively angularly-offset planes to effect a spiral feed of the log therethrough and to perform a prelimary debarking operation, a pair of smooth surfaced wheels spaced from and in substantial alignment with said spur wheels and mounted to rotate in relatively angularly-offset planes to continue the spiral feed of the log, means for driving both pairs of wheels, and a flail mounted between said wheels and having a heavy-weight flail member adjacent said spur wheels and a light-weight flail member adjacent said smooth surfaced wheels.

12. In a log debarking machine, first and second reciprocating carriages spaced apart at opposite sides of said machine, means for moving said carriages, means on said carriages for rotating a log supported thereon and moving therewith, a pair of universally mounted spur wheels for receiving the logs from the first carriage, means for adjusting the angle of rake of said spur wheels, smooth tired wheels universally mounted in spaced relation to said spur wheels and positioned to receive the log therefrom and to pass the log onto said second carriage, a flailing device between said spur and smooth tired wheels constructed and positioned to remove the bark from the log, and elevating and ejecting means for the log mounted in connection with said second carriage.

13. In a log debarking machine, a support rotatable about a fixed axis, means for axially moving a log parallel to the axis of the support and in adjacency to the support and for simultaneously rotating the log and support, flexible flailing members being carried by the rotating support and having sufficient length to wrap around a substantial circumferential area of a log so as to pound and pull the bark from the log.

14. In a log debarking machine, means for axially moving and simultaneously rotating a log, spur wheels positioned to bite into the bark of the rotating and axially moving log to perform a first debarking operation, a heavy flailing chain rotatably supported to rotate about an axis substantially parallel to the path of axial movement of the log and positioned to strike the bark of the log after passing through said spur wheels to perform a second debarking operation on the log, and a lighter chain rotatably mounted on an axis substantially parallel to the path of movement of the rotating log and positioned to encounter the log after moving past said heavier chain to perform a third debarking operation upon said log.

15. In a log debarking machine, means for rotatably supporting and axially moving a log, a first debarking means having piercing elements for piercing the bark of the rotating and axially moving log, a second debarking means having a heavy flailing member rotatably supported about an axis substantially parallel with the path of movement of the log and positioned to encounter and subject the bark to heavy blows after passing said first debarking means, and a third debarking means having a lighter flailing member rotatably mounted about an axis substantially parallel with the path of axial movement of the log and positioned with reference to the log to permit the lighter flail to wrap at least partially about the circumference of the log to drag the loosened bark from the log in a final debarking operation.

16. In a log debarking machine, first and second movable carriages spaced apart at opposite sides of said machine, means for moving said carriages, means on said carriages for rotating a log supported thereon and moving therewith, a pair of universally mounted feed wheels for receiving the logs from the first carriage, said feed wheels being spaced apart in edge to edge relation to receive a log therebetween, the center of rotation of one wheel being above the center of rotation of the other wheel, means for adjusting the angle of rake of said feed wheels, a pair of smooth surfaced wheels universally mounted in longitudinally spaced relation to said feed wheels and positioned in spaced edge to edge relation to receive the log from the feed wheels, the center of rotation of one wheel being above the center of rotation of the other wheel, said smooth surfaced wheels receiving the log from the feed wheels and passing the log onto said second carriage, and a debarking device mounted between the feed and smooth surfaced wheels in the path of movement of the log to remove the bark from the log.

17. In a log debarking machine, first and second movable carriages spaced apart at opposite sides of said machine, means for moving said carriages, means on said carriages for rotating a log supported thereon and moving therewith, a pair of universally mounted feed wheels for receiving the logs from the first carriage, means for adjusting the angle of rake of said feed wheels, smooth surfaced wheels universally mounted in spaced relation to said feed wheels and positioned to receive the log therefrom and to pass the log onto said second carriage, a debarking device between said feed and smooth surfaced wheels constructed and positioned to remove the bark from the log, and means for adjusting the distances between the feed wheels and also between the smooth tired wheels to accommodate logs of various diameters.

JOHN R. BOSWELL.

References Cited in the file of this patent

UNITED STATES PATENTS

| Number | Name | Date |
|---|---|---|
| 737,646 | Moreau | Sept. 1, 1903 |
| 987,828 | Schenck | Mar. 28, 1911 |
| 1,017,655 | Drake | Feb. 20, 1912 |
| 1,090,463 | Eidsaether | Mar. 17, 1914 |
| 1,189,395 | Shaw | July 4, 1916 |
| 1,373,243 | Hellstrom | Mar. 29, 1921 |
| 1,438,904 | Crouse | Dec. 12, 1922 |
| 1,552,498 | Noyes | Sept. 8, 1925 |
| 1,567,441 | Howard | Dec. 29, 1925 |
| 1,670,723 | Hummel | May 22, 1928 |
| 1,905,387 | Kirkwood | Apr. 25, 1933 |
| 1,955,437 | Oeser | Apr. 17, 1934 |
| 2,011,037 | Cook | Aug. 13, 1935 |
| 2,044,561 | Bidle | June 16, 1936 |
| 2,305,281 | Taylor | Dec. 15, 1942 |
| 2,390,459 | Power | Dec. 4, 1945 |
| 2,461,924 | Robertson | Feb. 15, 1949 |

FOREIGN PATENTS

| Number | Country | Date |
|---|---|---|
| 13,472 | Norway | 1904 |